(12) United States Patent
Becker et al.

(10) Patent No.: US 11,969,847 B2
(45) Date of Patent: Apr. 30, 2024

(54) MODULAR FIXTURE PLATE ALIGNMENT SYSTEM

(71) Applicant: MetrologyWorks, Inc., Buckner, MO (US)

(72) Inventors: Eric S. Becker, Spirit Lake, IA (US); Joel R. Gorden, Grain Valley, MO (US)

(73) Assignee: METROLOGYWORKS, INC., Buckner, MO (US)

( * ) Notice: Subject to any disclaimer, the term of this patent is extended or adjusted under 35 U.S.C. 154(b) by 244 days.

(21) Appl. No.: 17/325,198

(22) Filed: May 19, 2021

(65) Prior Publication Data

US 2022/0371145 A1  Nov. 24, 2022

(51) Int. Cl.
*B23Q 37/00* (2006.01)
*B23Q 1/03* (2006.01)

(52) U.S. Cl.
CPC .......... *B23Q 37/005* (2013.01); *B23Q 1/032* (2013.01)

(58) Field of Classification Search
CPC ............................. B23Q 37/005; B23Q 1/032
See application file for complete search history.

(56) References Cited

U.S. PATENT DOCUMENTS

| | | |
|---|---|---|
| 1,571,092 A | 1/1926 | Lally |
| 1,894,061 A | 1/1933 | Sanders |
| 3,512,324 A | 5/1970 | Reed |
| 4,805,887 A | 2/1989 | Ray |
| 5,052,158 A | 10/1991 | D'Luzansky |
| 5,064,321 A | 11/1991 | Barnes |
| 5,809,905 A | 9/1998 | John et al. |
| 6,431,936 B1 | 8/2002 | Kiribuchi |
| 10,183,380 B2 | 1/2019 | Phillips |
| 11,458,597 B2 | 10/2022 | Phillips |
| 2010/0299945 A1 | 12/2010 | Lacy |
| 2011/0179728 A1 | 7/2011 | Cerny et al. |

(Continued)

FOREIGN PATENT DOCUMENTS

| | | |
|---|---|---|
| DE | 202009010082 U1 | 10/2009 |
| EP | 1 120 189 A1 | 8/2001 |

(Continued)

OTHER PUBLICATIONS

Jergens Ball Lock Mounting Systems Catalog, published in 2005, 24 pages.

(Continued)

*Primary Examiner* — Nirvana Deonauth
(74) *Attorney, Agent, or Firm* — Cozen O'Connor

(57) ABSTRACT

A modular fixture plate system includes fixture plates and docking stations for securing the fixture plates to a worksurface. Fixture plates include recessed corners for receiving keystones. A keystone may be used as a docking station in addition to or instead of a corresponding rail system. Fixture plates include magnets for providing a secure attachment to keystones, rails and other fixture plates to allow for rapid loading of parts and plates on any CMM or manufacturing system. Fixture plates are designed to be stacked multiple wide to fill the table and maximize coverage of a work surface. The keystone design allows a user to create L configurations or T configurations of plates from a single docking location.

18 Claims, 24 Drawing Sheets

(56) References Cited

U.S. PATENT DOCUMENTS

| | | | |
|---|---|---|---|
| 2013/0167458 A1* | 7/2013 | Cerny | ............... E04F 15/10 52/177 |
| 2013/0175751 A1 | 7/2013 | Canuto | |
| 2015/0097327 A1 | 4/2015 | Morgan | |
| 2022/0371145 A1 | 11/2022 | Becker et al. | |
| 2023/0140513 A1 | 5/2023 | Phillips | |

FOREIGN PATENT DOCUMENTS

| | | |
|---|---|---|
| EP | 2 103 537 A1 | 9/2009 |
| EP | 2 292 381 A1 | 3/2011 |
| EP | 2 417 871 A1 | 2/2012 |
| GB | 1 341 356 A | 12/1973 |
| WO | WO 2006/129264 A1 | 12/2006 |
| WO | WO 2011/064349 A1 | 6/2011 |

OTHER PUBLICATIONS

Jergens 2009 Master Catalog, published in 2009, 5 pages.
R&R Sales and Engineering, Maximize Your Vision: Fixturing For Vision Systems, published in 2010, 4 pages.
R&R Sales and Engineering, R&R Modular Fixtures: Component Catalog, published in 2008, 24 pages.

* cited by examiner

MODULAR FIXTURE PLATE ALIGNMENT SYSTEM

TECHNICAL FIELD

The present application relates to fields of manufacture and inspection processes and more particularly, to apparatus and methods for positioning a workpiece and other devices during manufacturing and/or inspection processes.

BACKGROUND

Many manufacturing and/or inspection processes require precise and repeatable positioning of workpieces. Manufacturing processes may include, for example, laser machining, marking and etching and other types of printing and marking. Inspection processes, such as a Coordinate Measuring Machine (CMM) may include taking measurements using a laser or other devices.

All of these processes typically require a workpiece to be held in an accurate position. Often, a series of workpieces will be subjected to the same process. Each workpiece needs to be placed in the same, repeatable position so that the process may be performed consistently and accurately on all workpieces.

Fixture plates are often used to position both workpieces and manufacturing/inspection devices. Fixture plates typically have a pattern of threaded holes for attaching elements such as clamps, magnets, screws, hold-downs and other device that can retain a workpiece in a known and repeatable position relative to a manufacturing or inspection device. Most processes are performed on a series of workpieces which is why it is important that positioning of workpieces is repeatable in a quick and convenient way.

The top surface of a workbench or table may be outfitted with one or more fixture plates of varying sizes. Using a plurality of fixture plates that can be rearranged or swapped in and out can add flexibility and speed to a manufacturing or inspection process, but increases the likelihood that workpieces may not be positioned correctly.

SUMMARY OF THE EMBODIMENTS

In a first aspect, a modular fixture plate system includes fixture plates and docking stations for securing the fixture plates to a worksurface. Fixture plates include recessed corners for receiving keystones. A keystone may be used as a docking station in addition to or instead of a corresponding rail system. Fixture plates include magnets for providing a secure attachment to keystones, rails and other fixture plates to allow for rapid loading of parts and plates on any CMM or manufacturing system. Fixture plates are designed to be stacked multiple wide to fill the table and maximize coverage of your work surface. The keystone design allows a user to create L configurations or T configurations of plates from a single docking location.

DETAILED DESCRIPTION OF THE EMBODIMENTS

A modular fixture plate system provides flexible and repeatable setups for any process that may be performed on one or more workpieces. Fixture plates are used with keystones that allow for quick magnetic attachment of two or more plates across a worksurface. Keystones also allow the creation of "L-shaped" or "T-shaped" configurations of fixture plates from a single docking location. Like numbers indicate like features throughout the figures.

Figure 1:
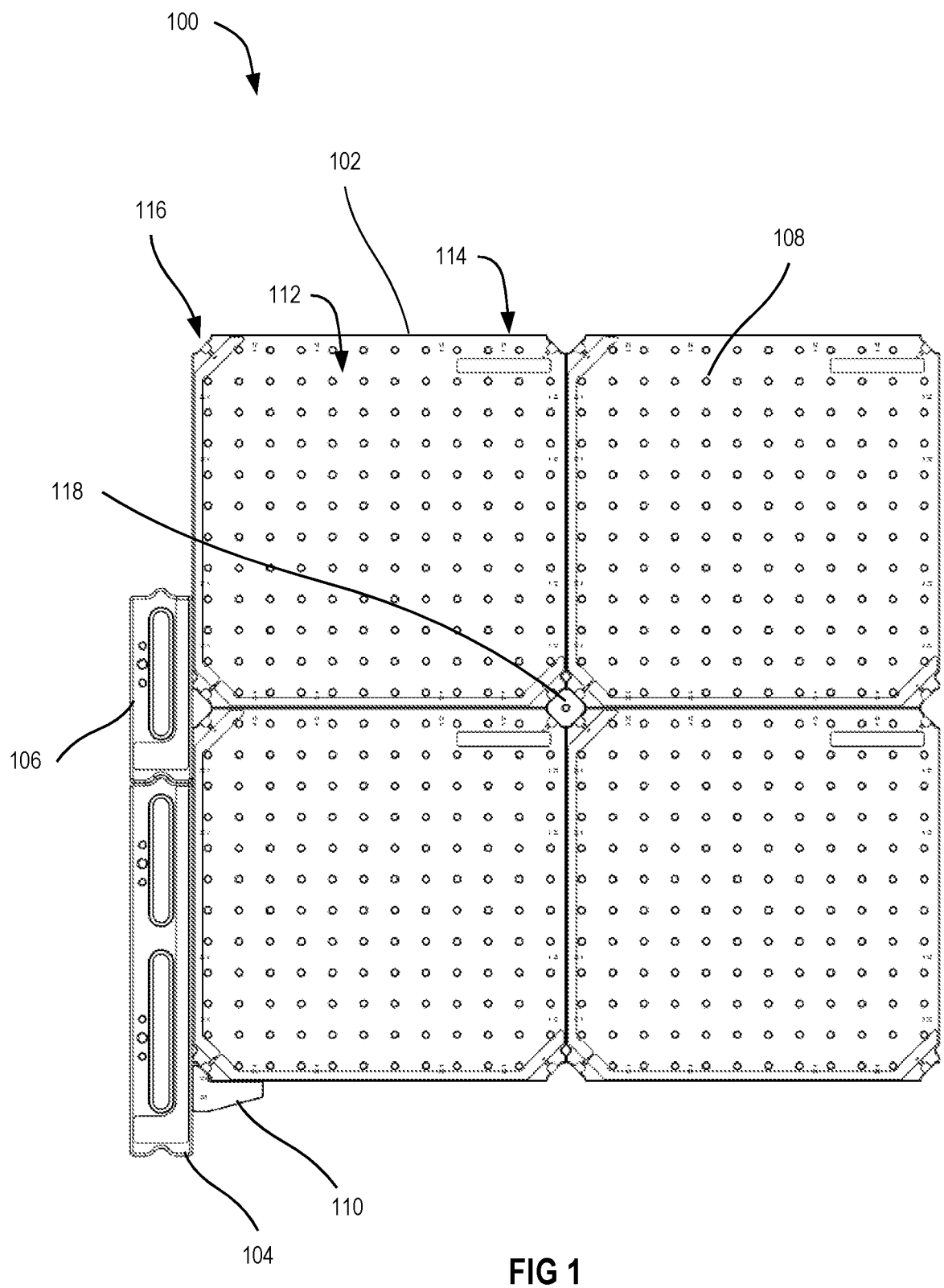
FIG. 1 is a top view of a modular fixture plate system, in an embodiment.

FIG. 1 is a top view of a modular fixture plate system 100, in embodiments. Although a specific arrangement of components is shown, this is for purposes of illustration other arrangements are possible. Four fixture plates 102 are retained against a rail 104 using magnets. In embodiments, rail 104 is extended in length with the addition of rail extender 106 however, rail 104 is not limited any length and may extend across an entire worksurface. Fixture plates 102 are provided with a grid of threaded holes 108 or similar attachment points. Threaded holes 108 receive a threaded fastener such as clamps, screws, hold-downs or other devices for retaining workpieces. Threaded holes may also be used to retain manufacturing or inspection devices directly or through the addition of brackets.

A hard stop 110 is attached to rail 104 to retain fixture plates in position, as will be explained in more detail below. As depicted in FIG. 1, each fixture plate 102 includes a top surface 112 and four side edges 114, each side edge 114 is perpendicular to top surface 112 and to adjoining side edges 114. Fixture plate 102 also has recessed corners 116 having a corner contour. In embodiments, at least one magnet is embedded in a face of the recessed corner 116.

Recessed corners 116 cooperate with one or more chamfered keystones 118. Chamfered keystone 118 is made from a ferromagnetic material designed to be retained by the magnet in recessed corner 116. As shown in FIG. 1, chamfered keystone 118 has a keystone contour of a square with chamfered corners that cooperates with the corner contour of recessed corners 116. In embodiments, chamfered keystone 118 may have any contour that is any shape with 90-degree rotational symmetry, for example, a circle, square, octagon, eight-pointed star, etc. Chamfered keystone 118 cooperates with recessed corners 116 to prevent movement of fixture plates in a variety of configurations. Recessed corners 116 have a contour that cooperates with the keystone contour, such as a quarter circle, etc.

Figure 2:
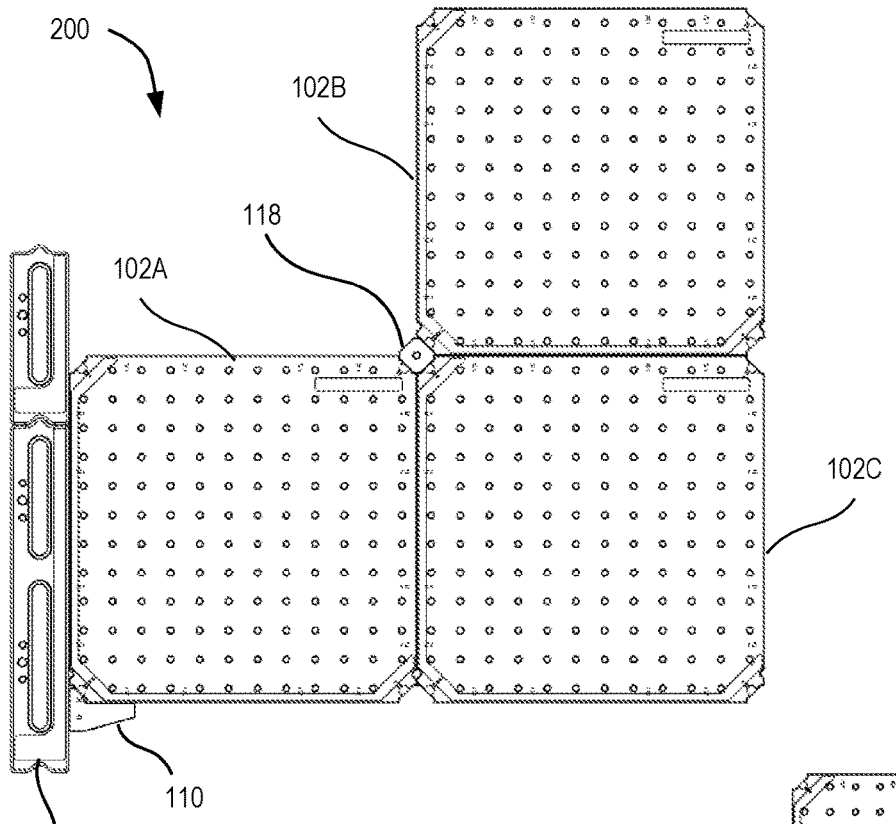
FIG. 2 is a top view of a modular fixture plate system in a "L-shaped" configuration, in embodiments.

FIG. 2 is a top view of a modular fixture plate system 200 in an "L-shaped" configuration. Fixture plate 102A is retained against rail 104 with magnets and hard stop 110. Chamfered keystone 118 cooperates with recessed corners to retain fixture plate 102B against fixture plate 102C without requiring a fourth fixture plate retained between fixture plate 102B and rail 104 as shown in FIG. 1. The corner contours of fixture plates 102A, 102B and 102C engage with the corner contour of chamfered keystone 118 to prevent sliding or movement of the fixture plates.

Figure 3:
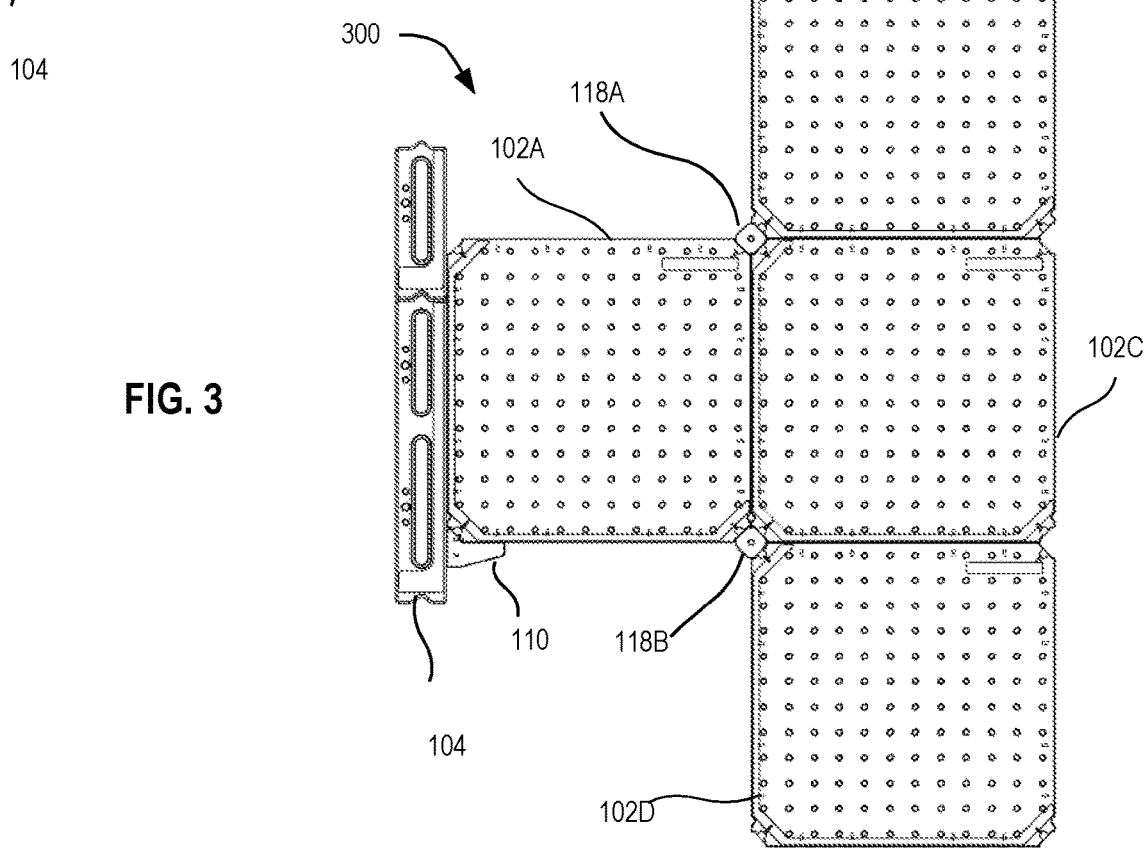
FIG. 3 is a top view of a modular fixture plate system in a "T-shaped" configuration, in embodiments.

FIG. 3 is a top view of a modular fixture plate system 300 in an "T-shaped" configuration. Fixture plate 102A is retained against rail 104 with magnets and hard stop 110. Chamfered keystone 118A cooperates with recessed corners to retain fixture plates 102B and 102C in position as shown in FIG. 2. A second chamfered keystone 118B is added to retain fixture plate 102D against a side edge of fixture plate 102C without requiring a fourth fixture plate retained between fixture plate 102B and rail 104.

Providing a flexible layout as shown in FIGS. 2 and 3 means fewer fixture plates are needed on the worksurface which may reduce the cost of the system or allow fixture plates to be used for staging workpieces. In this embodiment, workpieces are secured to a fixture plate in a staging process so the fixture plates with mounted workpieces may be moved into position for a process instead of the workpieces themselves.

Chamfered Keystone and Fixture Plate

Figure 4:
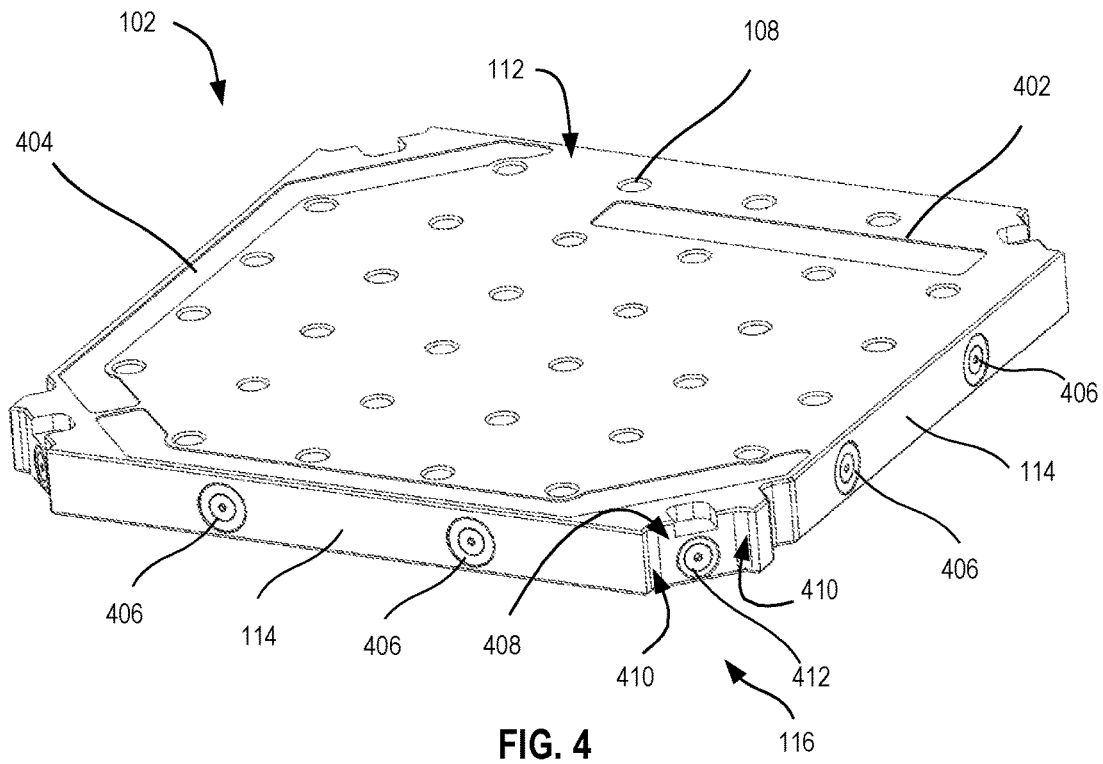
FIG. 4 is a perspective view of a fixture plate, in embodiments.
Figure 5A:
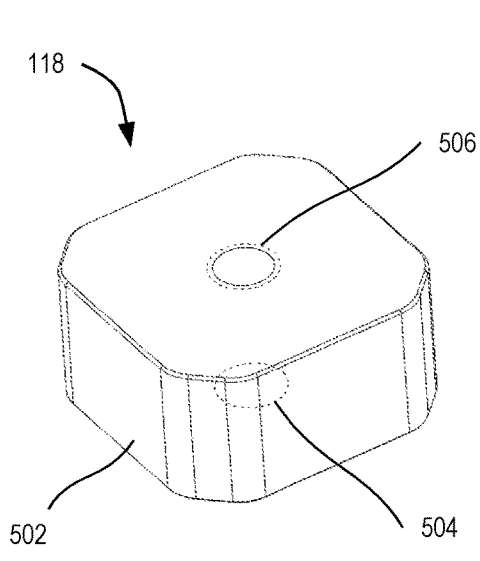
FIG. 5A is a perspective view of a keystone for use with the fixture plate of FIG. 4, in embodiments.
Figure 5B:
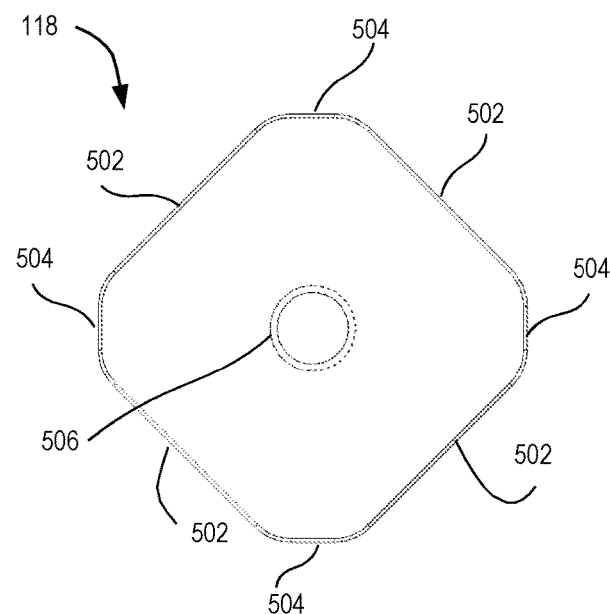
FIG. 5B is a top view of a keystone for use with the fixture plate of FIG. 4, in embodiments.

FIG. 4 is a perspective view of a fixture plate, in embodiments. FIG. 5A is a perspective view and FIG. 5B is a top view of a keystone for use with the fixture plate of FIG. 4, in embodiments. FIGS. 4, 5A and 5B are best viewed together in the following description.

Fixture plate 102 has a generally square top surface 112. This shape is for purposes of illustration and other shapes are contemplated, as explained herein. Top surface 112 may include recessed areas 402 and 404 for receiving decals with various indicia indicating measurements or labels. Four side edges 114 are perpendicular to top surface 112. A plurality of side edge magnets 406 are embedded in each side edge 114. Although two side edge magnets 406 are shown, any number of magnets may be provided.

Recessed corner 116 has a corner contour including interior chamfer 408 and two corner faces 410. Interior chamfer 408 is approximately 45 degrees relative to adjoining side edges 114. Corner faces 410 connect interior chamfer 408 to side edges 114 and are approximately 90 degrees relative to side edges 114. A corner magnet 412 is positioned in interior chamfer 408 for engaging with chamfered keystone 118.

The corner contour of recessed corner 116 cooperates with chamfered keystone 118 to prevent movement of fixtures plates relative to each other. Chamfered keystone 118 has a chamfered contour that matches the corner contour of recessed corner 116. Keystone edge 502 cooperates with interior chamfer 408 and keystone corner edges 504 cooperate with corner faces 410. Adjacent fixture plates 102 are drawn to each other by magnets 406 embedded in side edges 114 of each fixture plate. Chamfered keystone 118 is made from a ferromagnetic material such as magnetic 17-4 stainless steel and, when positioned in the recessed corners of adjacent fixture plates, holds them securely in place to prevent movement. In embodiments, chamfered keystone 118 is made from aluminum with magnets added to keystone edges 502 that are attracted to magnets 412 in recessed corners 116. Further, flat-head screws made from magnetic SS or black oxide steel bolts could be provided in keystone edges 502. A threaded counterbore 506 may be provided in the center of chamfered keystone 118 which would allow it to be bolted down to a worksurface, as described in more detail below. In embodiments, fixture plate 102 and chamfered keystone 118 have a thickness of approximately 0.125 to 2 inches.

Figure 6:
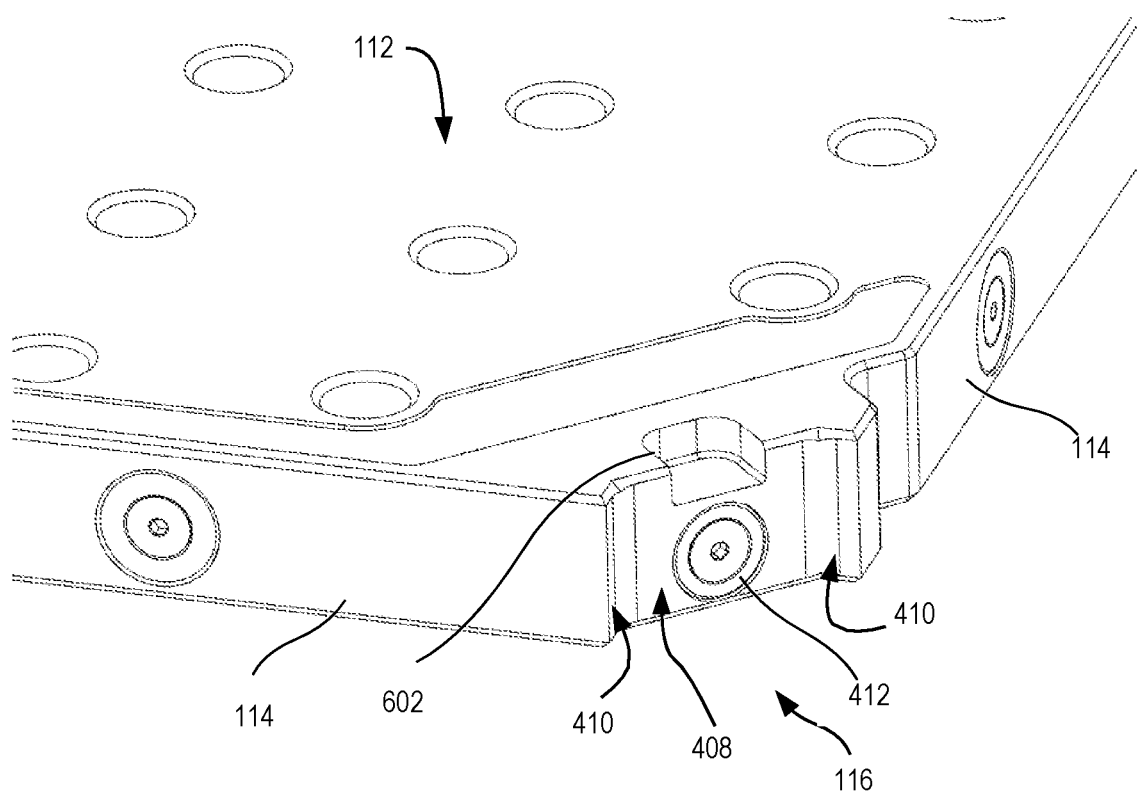
FIG. 6 is a close-up view of a recessed corner of the fixture plate of FIG. 4, in embodiments.
Figure 7:
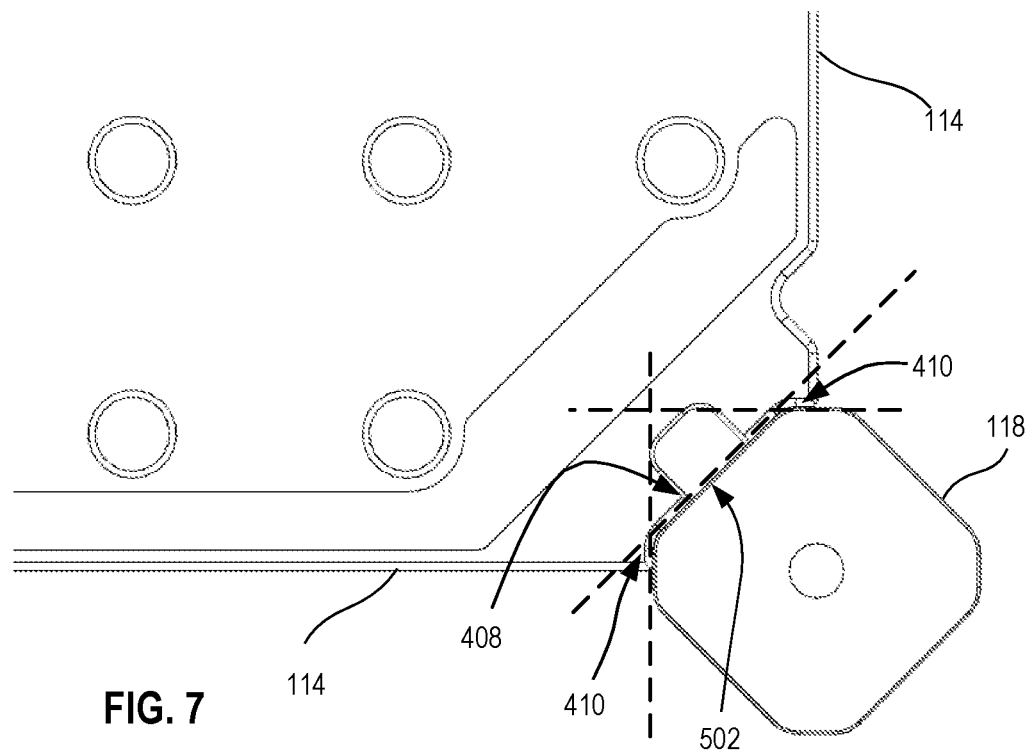
FIG. 7 is a partial top view of a recessed corner and keystone of FIGS. 4-6, in embodiments.

FIG. 6 is a close-up view of recessed corner 116 of the fixture plate 102. FIG. 7 is a partial top view of recessed corner 116 with chamfered keystone 118 positioned in recessed corner 116 as it would be used to retain fixture plates 102. As shown in FIG. 6, in addition to magnet 412, tab cutout 602 may be provided for receiving a tab on chamfered keystone 118, discussed in more detail below. FIG. 7 includes dashed lines that illustrate the geometric relationship of interior chamfer 408, corner faces 410 and side edges 114 of fixture plate 102. Interior chamfer is formed at a 45-degree angle with side edges 114 and corner faces 410 are formed perpendicularly to side edges 114.

Chamfered keystone 118 of FIGS. 1-7 has a keystone contour of a square with chamfered corners, however, this is not the only contour that may be used. In general, keystones for use in a modular fixture plate system may have any contour as long as it is a shape with 90-degree rotational symmetry as described above. Another embodiment of a fixture plate and keystone are shown in FIGS. 8 and 9.

Discussions herein generally apply to either of the disclosed keystones contours, as well as any other regular polygon contour.

Square Keystone and Fixture Plate

Figure 8:
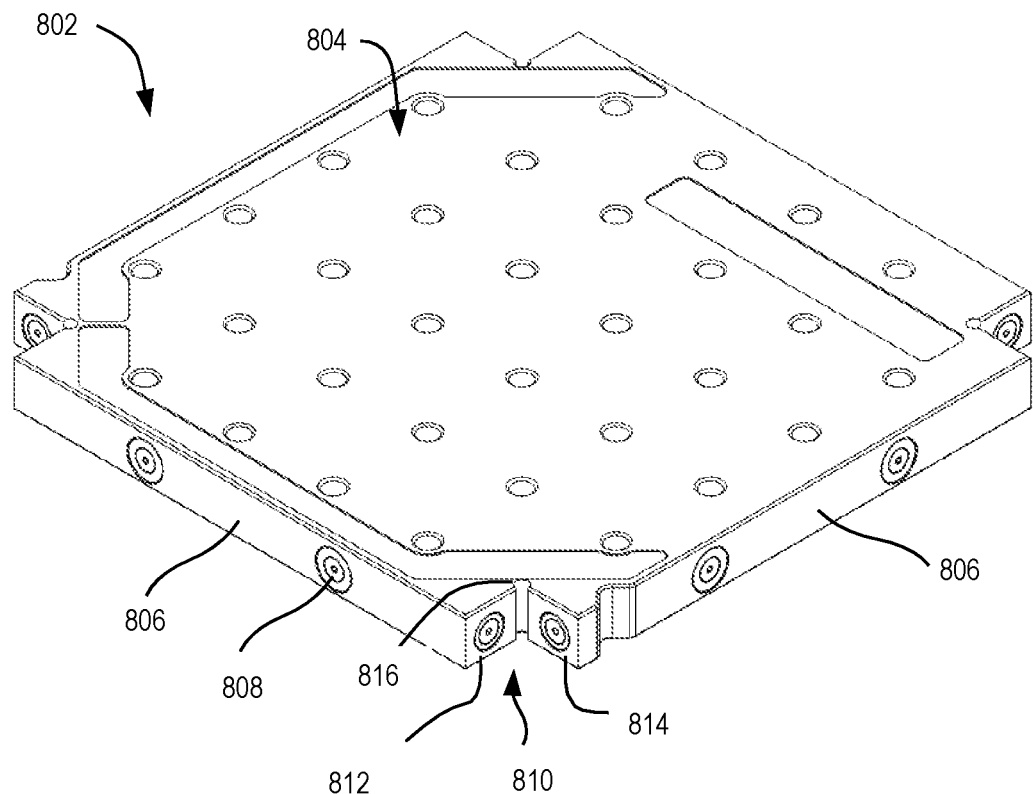
FIG. 8 is a perspective view of another fixture plate for use in a modular fixture plate system, in embodiments.
Figure 9:
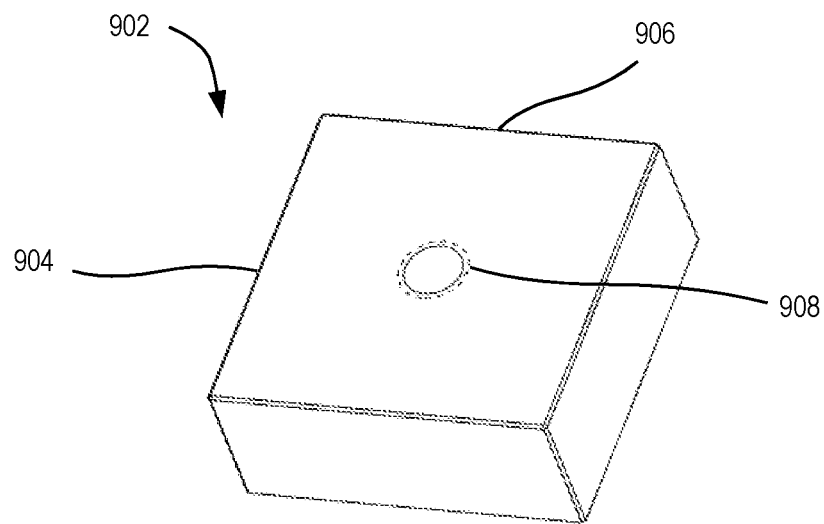
FIG. 9 is a perspective view of a keystone for use with the fixture plate of FIG. 8.

FIG. 8 is a perspective view of a fixture plate, in embodiments. FIG. 9 is a perspective view and FIG. 5B is a top view of a keystone for use with the fixture plate of FIG. 8, in embodiments. FIGS. 8 and 9 are best viewed together in the following description.

Fixture plate 802 has a generally square top surface 804 and four side edges 806 like fixture plate 102. Each side edge 806 may have a plurality of magnets 808. Fixture plate 802 also features recessed corners 810 however they have a different corner contour. Recessed corner 810 has a right-angle corner contour with two corner faces 812 and 814 that are at approximately 90 degrees from each other and side edges 806. Corner faces 812 and 814 may be provided with a magnet for retaining square keystone 902.

Square keystone 902 has a generally square top contour. When used with fixture plate 802, side edge 904 cooperates with corner face 812 and side edge 906 cooperates with corner face 814. For ease of manufacturing square keystone 902, a corner relief 816 may be provided where corner faces 812 and 814 meet to accommodate a corner of square keystone 902. In an alternative, corner relief 816 may not be needed if a small chamfer or rounding is added to corners of square keystone 902. A threaded hole 908 and counterbore may be provided in the center of square keystone 902 which would allow it to be bolted down to a worksurface, as described in more detail below.

Rail and Hard Stop

Figure 10:
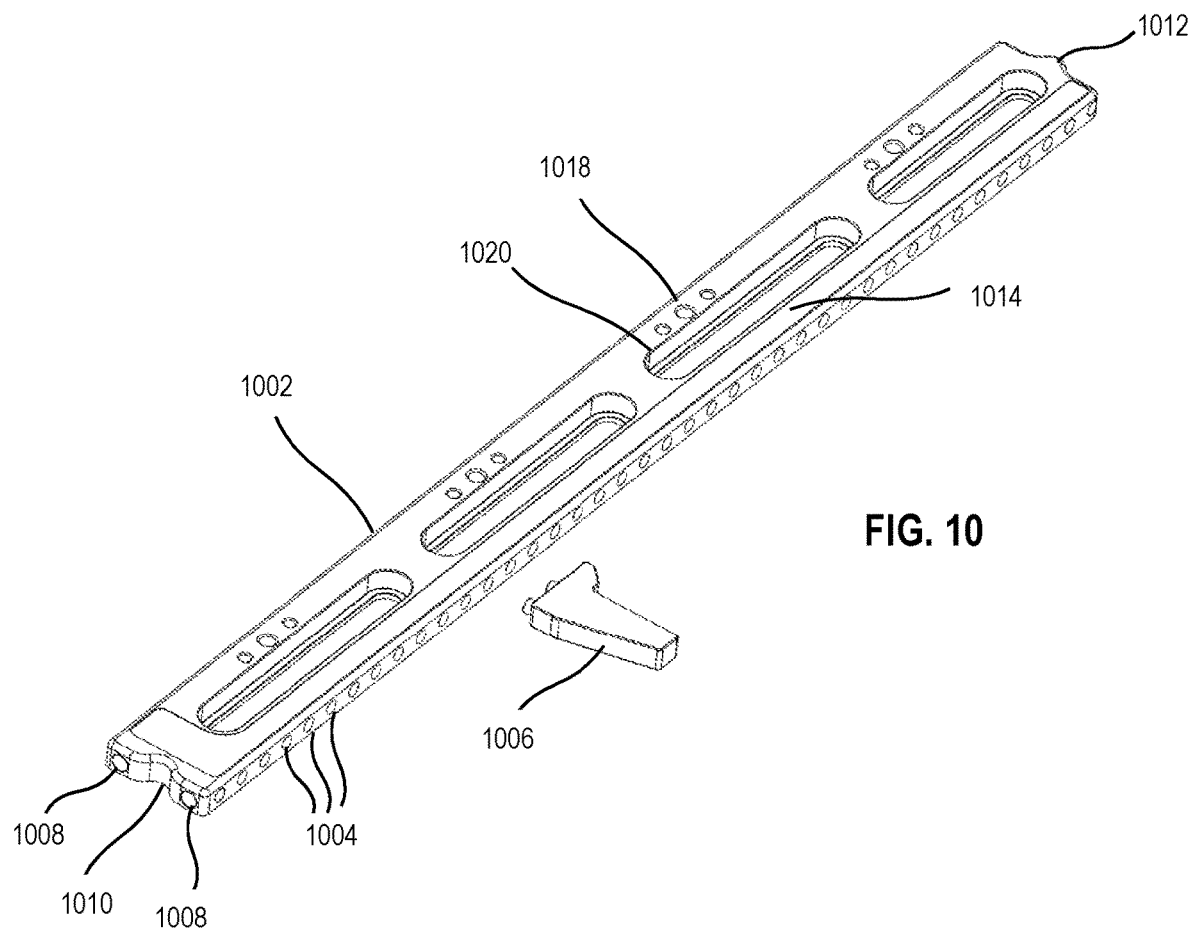
FIG. 10 shows a top view of a rail for use in a modular fixture plate system, in embodiments.

FIG. 10 shows a top view of a rail for use in a modular fixture plate system, in embodiments. A rail for modular fixture systems is typically installed on a worksurface using bolts or other mechanisms that hold rail securely. This allows the rail to serve as a secure docking location to allow fixture plates to be conveniently and flexibly attached. Rail 1002 offers a set of closely spaced holes on both sides of rail 1002, indicated at 1004. In embodiments, holes 1004 may have a spacing of approximately 15 mm or 0.6 in. Holes 1004 are used to engage with pins on hard stop 1006. Providing closely spaced holes 1004 along the length of rail 1002 allows for much finer resolution and flexibility in terms of where a fixture plate may be positioned, as well as accommodates a larger variety of fixture plate sizes instead of just 2 or 3 sizes that work. Laser Marking machines, for example, often have a sweet spot or a defined work envelope. The amount of variation provided by holes 1004 in rail 1002 will be very forgiving of where the rail is tied down on a worksurface.

In embodiments, rail 1002 may be have a variety of lengths in metric and standard measuring systems. A range of lengths, for example, 150-600 mm or 6-24 inches may be provided. These lengths are not limiting, however, and any length of rail may be used. Any rail 1002 may be extended by adding another rail 1002 end to end. Magnets 1008 on both ends of rail 1002 hold the rails together. Additionally, indent 1010 on the end of one rail 1002 cooperates with outdent 1012 on the end of another rail 1002 to aid in positioning.

The top side of rail 1002 may include a recessed area 1014 for receiving a decal showing various indicia such as hole numbers. This indicia aids in repeating particular setups of fixture plates. Representative aux holes 1018 and counterbores 1020 for mounting bolts are shown. The specific size and dimensions are not limited by the depiction in FIG. 10.

In embodiments, rail 1002 is made from magnetic stainless-steel such as grade 17-4, although any suitable magnetic stainless steel could be used.

Figure 11A:
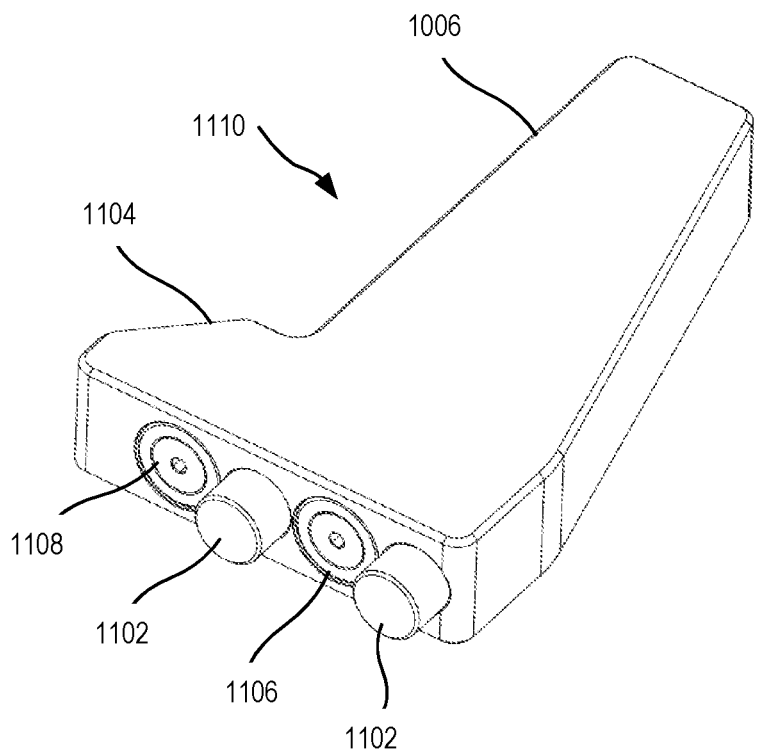
FIGS. 11A and 11B are perspective views of hard stops for use with a rail for a modular fixture plate system, in embodiments.
Figure 11B:
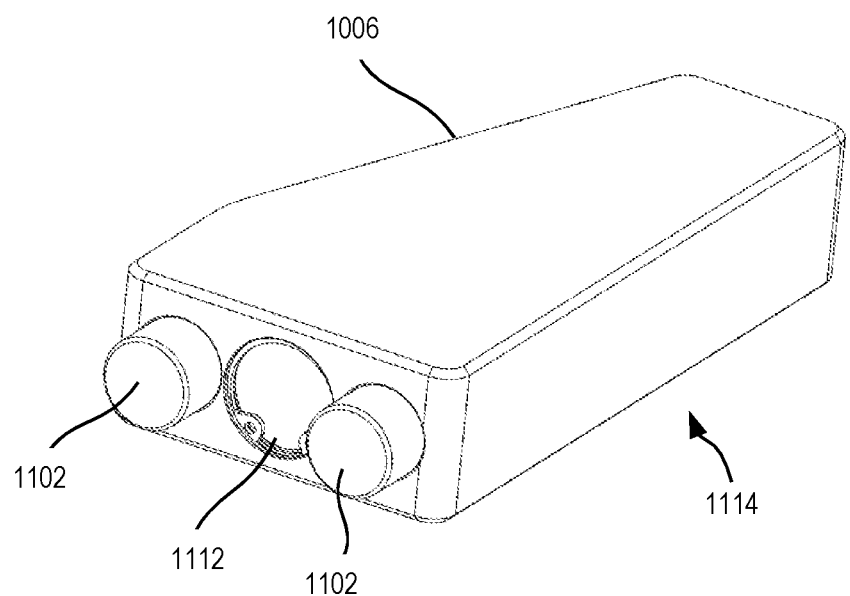

FIGS. 11A and 11B show two embodiments of a hard stop 1006 for use with rail 1002. In both embodiments, hard stop is an aluminum block or 17-4 stainless steel with two press fit gage pins 1102 and at least one magnet 1106, 1108 that will retain it against the stainless-steel rail 1002. FIG. 11A shows an embodiment with an extension 1104 in working edge 1110 that has a contour matched to a corner contour of fixture plate 102 when it is placed against rail 1002 and hard stop 1006. Extension 1104 provides room to include two magnets 1106 and 1108 between gage pins 1102. In embodiments, magnet 1108 may be omitted and a magnet (not shown) placed in extension 1104 along working edge 1110. FIG. 11B shows another embodiment of a hard stop with a single magnet 1112 installed with a snap ring between gage pins 1102. When the hard stop of FIG. 11B is retained against rail 1012, a fixture plate may be retained against working edge 1114. In both of FIGS. 11A and 11B, hard stops 1006 may be used in the orientation shown or flipped 180 degrees for increased flexibility. In further embodiments, hard stop 1006 may be a single gage pin.

Many variations and embodiments of fixture plates and keystones are contemplated. For purposes of illustration, several embodiments are shown or described but there are representative only and the features may be combined in many different ways. For example, some feature are shown in use with chamfered keystone 118 and others with square keystone 902 but any feature may be used with either keystone.

Keystone as Corner Dock

Figure 12A:
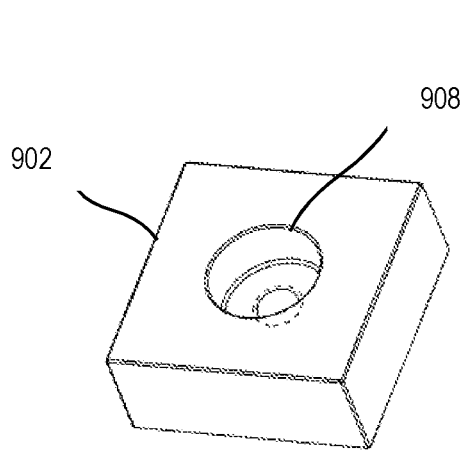
FIGS. 12A-12B are perspective views of keystones for use as a corner dock, in embodiments.
Figure 12B:
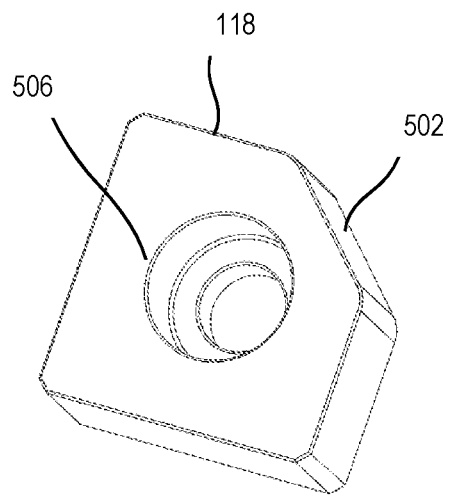

FIGS. 12A-12B are perspective views of keystones for use as a corner dock, in embodiments. Use of a keystone corner allows a user to dock plates without the need for a rail, making the system even smaller for tight spaces and providing a lower system entry price for tight budgets. Users can easily and quickly stage parts while the CMM or laser marking machine is running. As soon as the device stops working, users can rapidly swap the plate and restart the machine. FIG. 12A shows square keystone 902 of FIG. 9 with counterbore for bolting to a worksurface. FIG. 12B shows chamfered keystone 118 of FIG. 5 with counterbore 506. Edge 502 cooperates with recessed corner 116 of fixture plate 102.

Figure 12C:
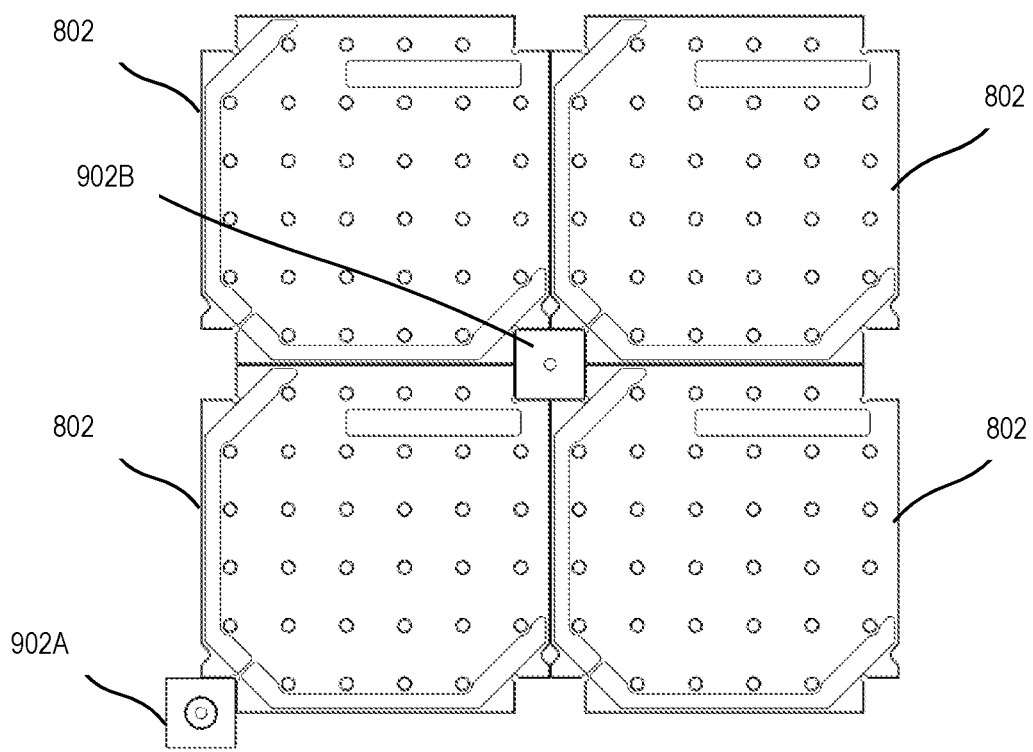
FIG. 12C is a top view of the keystone of FIG. 12A used as a corner dock, in embodiments.

FIG. 12C is a top view of the keystone of FIG. 12A used as a corner dock. Square keystone 902A is bolted to a worksurface and being used as a corner dock for one fixture plate 802. In embodiments, additional fixture plates 802 may be securely positioned by using square keystone 902B. Additional keystones may be used in other corners to provide greater security and immobility.

Figure 13A:
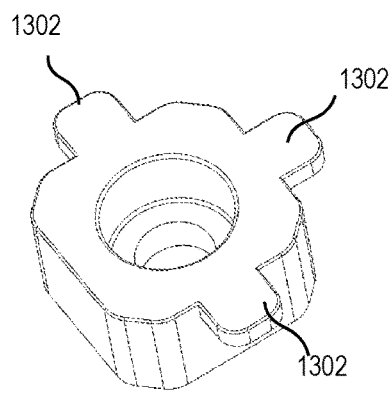
FIGS. 13A-13D depict keystones for use as a docking station with a fixture plate, in embodiments.
Figure 13B:
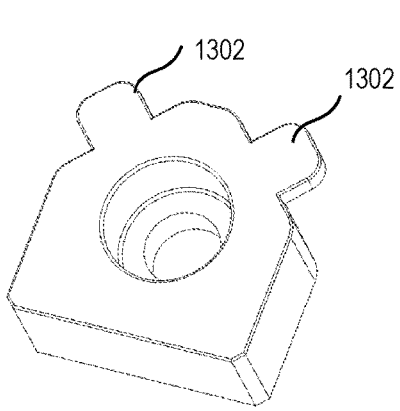
Figure 13C:
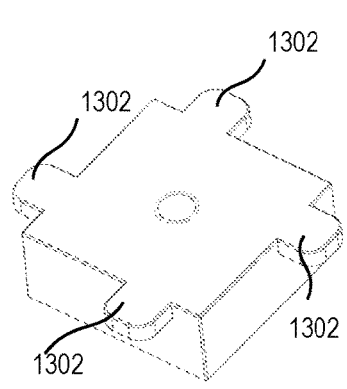
Figure 13D:
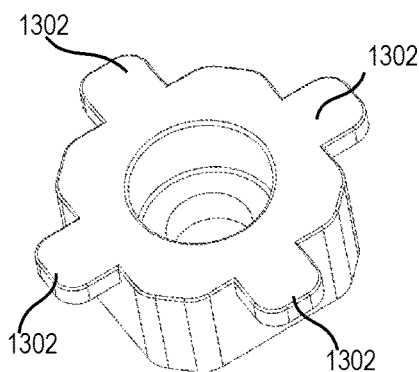

FIGS. 13A-13D depict keystones for use as a docking station with a fixture plate, in embodiments. Additional security in maintaining a fixture plate in position is provided by tabs on the keystones. The keystones of FIGS. 13A-13D include a counterbore that may be used for bolting to a worksurface. They also include one or more tabs 1302, which are sized to fit into tab cutout 602 in a recessed corner 116 of the fixture plate 102 of FIG. 6. FIG. 13A depicts a version of chamfered keystone 118 with three tabs 1302. FIG. 13B depicts a version of square keystone 902 with two tabs 1302. FIG. 13C depicts a version of square keystone 902 with four tabs 1302. FIG. 13D depicts a version of chamfered keystone 118 with four tabs 1302. Although examples of tabbed keystones are shown, these are representative and not limiting. Any keystone disclosed herein, including other regular polygons not specifically illustrated, may have one or several tabs.

Figure 14A:
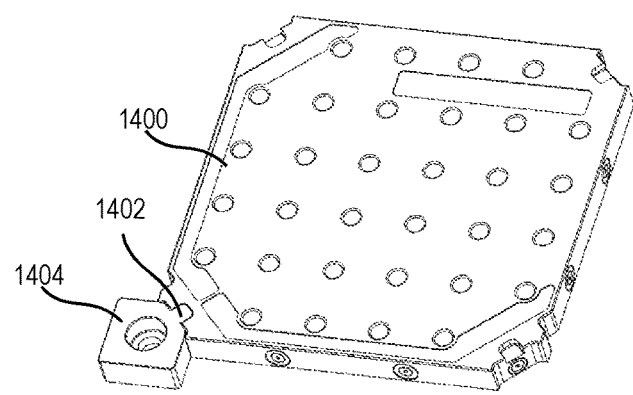
FIGS. 14A and 14B depict fixture plates docked to one or more keystones, in embodiments.
Figure 14B:
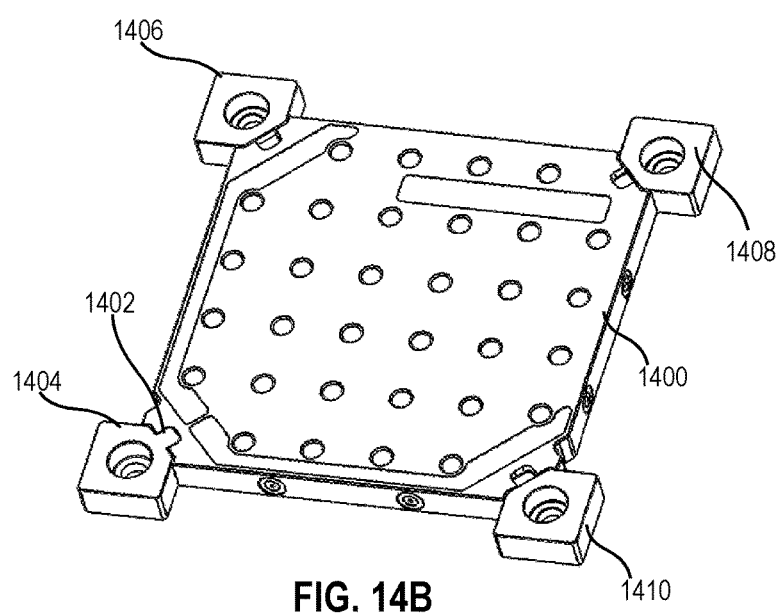

FIGS. 14A and 14B depict fixture plates docked to one or more keystones, in embodiments. FIG. 14A depicts a fixture plate 1400 docked to a single keystone 1404. In embodiments, a thickness of keystone 1404 is chosen relative to the thickness of fixture plate 1400 so that tab 1402 pulls down on fixture plate 1400 as keystone 1404 is bolted down to a worksurface. A single keystone 1404 may retain fixture plate 1400 in position for most uses, although it might be possible to slide fixture plate away from keystone 1404 in a direction parallel to tab 1402. In embodiments, a second keystone 1404 at any of the remaining three corners will securely retain fixture plate 1400. FIG. 14B depicts a fixture plate 1400 docked to keystone 1404 with tab 1402 and three additional keystones 1406, 1408 and 1410 that do not have tabs. In embodiments, one or all of keystones 1406, 1408 and 1410 may also have one or more tabs. Additional fixture plates may be attached to fixture plate 1400 using keystones as disclosed herein. Keystones with tabs may also be used with fixture plates docked to a rail. In embodiments, a keystone may be used as a docking feature by attaching to a worksurface magnetically instead of or in addition to being bolted down.

Extended Corner Docks

Figure 15A:
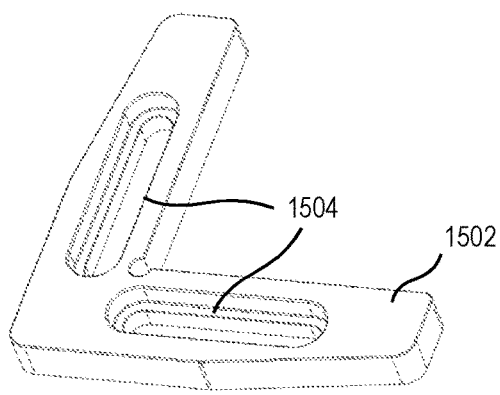
FIGS. 15A-15D depict additional corner docking stations, in embodiments.
Figure 15B:
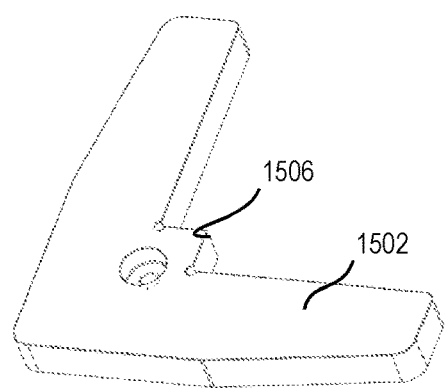
Figure 15C:
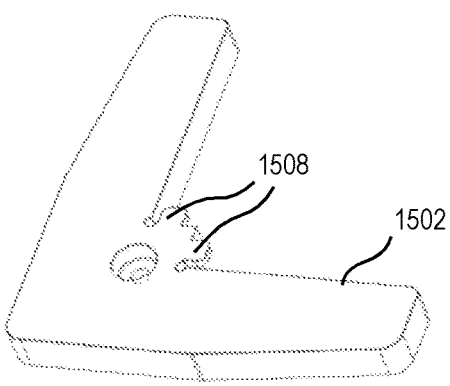
Figure 15D:
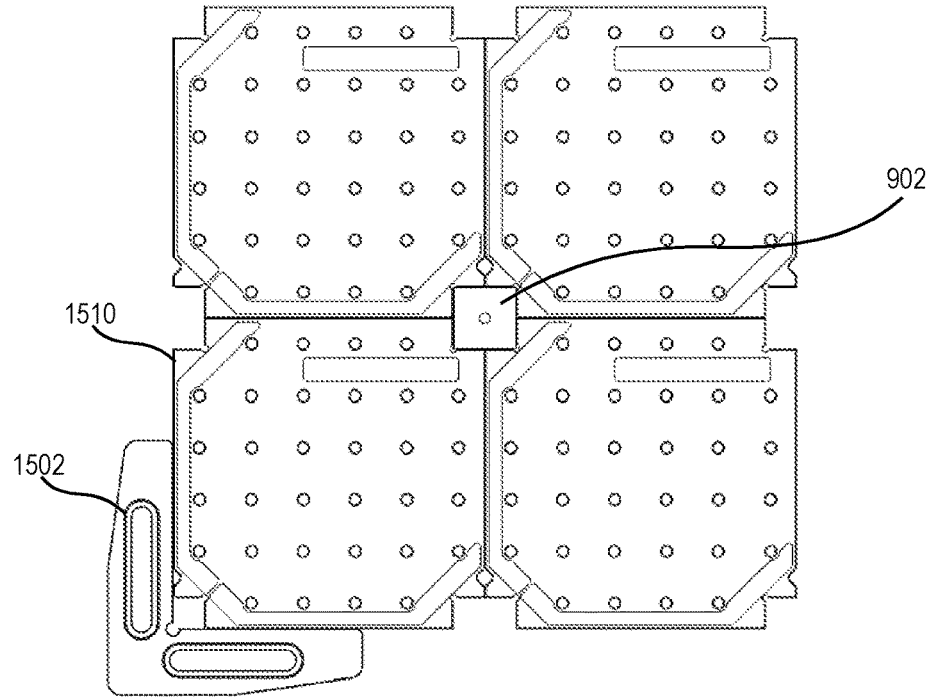

Many additional corner docking embodiments are contemplated, as depicted in FIGS. 15A-15D. Representative extended corner docks 1502 are depicted in FIGS. 15A-15C. Although specific extended corner docks are depicted, this is for the purposes of illustration only and any of the keystone and docking features disclosed herein may be combined in a variety of ways. FIG. 15A depicts an extended corner dock 1502 with two slots 1504 for bolting extended corner dock 1502 to a worksurface. FIG. 15B depicts an extended corner dock 1502 with a keystone 1506 for insertion into a recessed corner of a fixture plate. FIG. 15C depicts the extended corner dock 1502 of FIG. 15B with tabs 1508 similar to tabs 1302. FIG. 15D is a top view of extended corner dock 1502 of FIG. 15A in use a fixture plate 1510. Additional fixture plates may be added to fixture plate 1510 using square keystone 902, as explained herein.

Figure 16A:
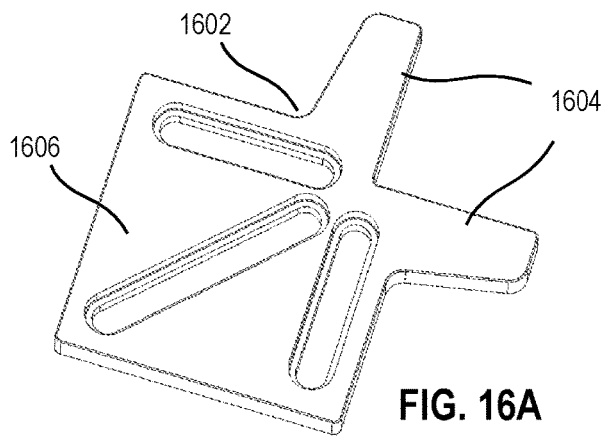
FIGS. 16A-16D depict further corner docking stations, in embodiments.
Figure 16B:
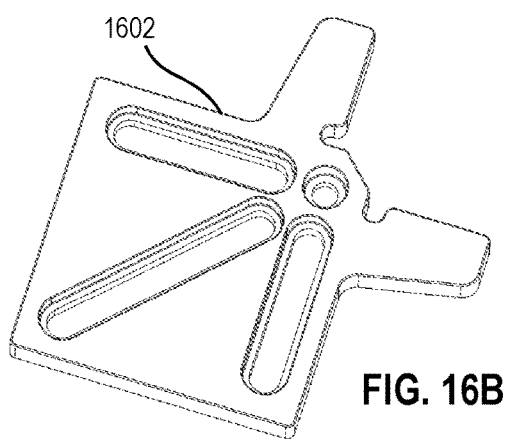
Figure 16C:
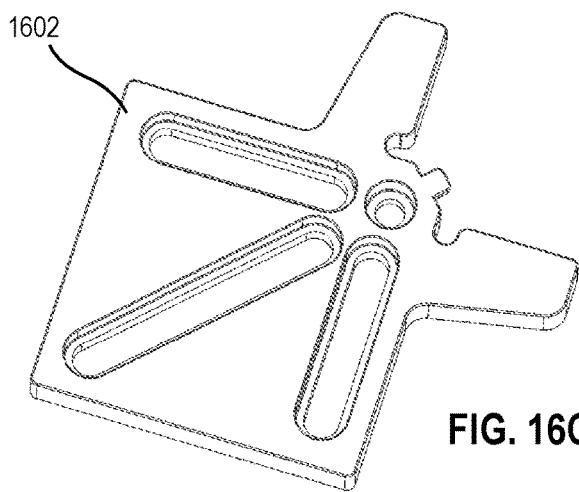
Figure 16D:
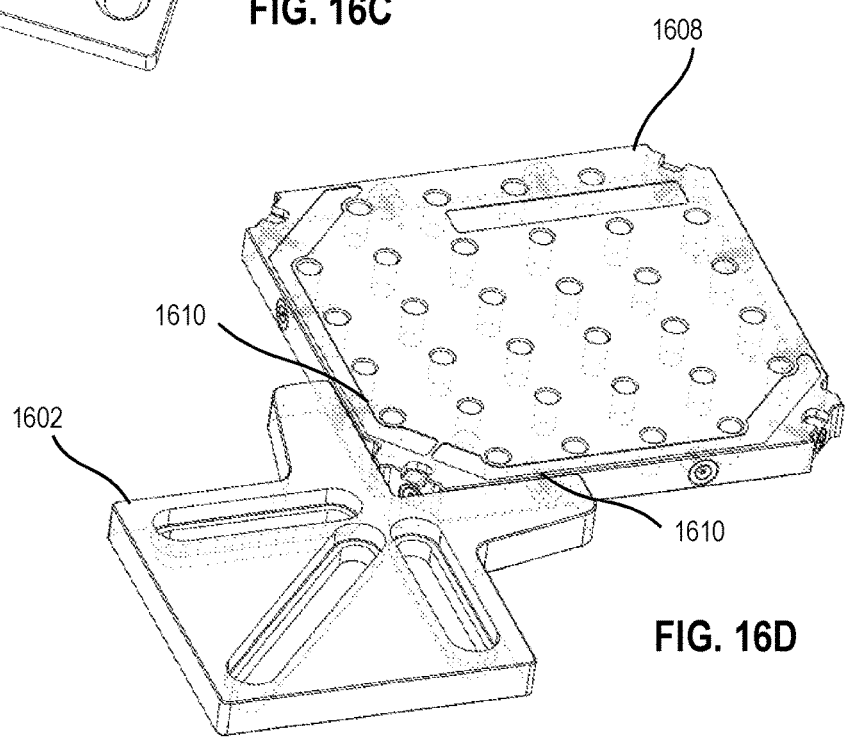

FIGS. 16A-16D depict further extended corner docking stations, in embodiments. Representative extended corner docks 1602 are depicted in FIGS. 16A-16C. Although specific corner docks are depicted, this is for the purposes of illustration only and any of the keystone and docking features disclosed herein may be combined in a variety of ways. As depicted in FIGS. 15A-15C, arms 1604 form a right angle for engaging with a fixture plate 1608, as shown in FIG. 16D. The location where arms 1604 meet may have a variety of configurations, such as the contour of chamfered keystone 118 as shown in FIG. 16B or a contour of chamfered keystone 118 with a tab as shown in FIG. 16C. Various slot and counterbore configurations are possible in mounting area 1606, as shown by a comparison of FIGS. 16A and 16B. These depictions are representative and other configurations are contemplated.

FIG. 16D depicts a perspective view of extended corner dock 1602 with fixture plate 1608 with magnets in the side edges and recessed corners of fixture plate 1608. In any of extended corner docks 1502 and 1602, magnets (not shown) may be provided in the arms to correspond with magnets 1610 in fixture plate 1608, for example. Any of extended corner docks 1502 and 1602 may be made from a ferromagnetic metal such at 17-4 SS or black oxide steel to engage with magnets. Alternatively, they may be made from aluminum with threaded magnetic inserts or flat head holts made from the same types of materials and positioned to align with magnets in fixture plates.

Magnetic Attachment

Figure 17A:
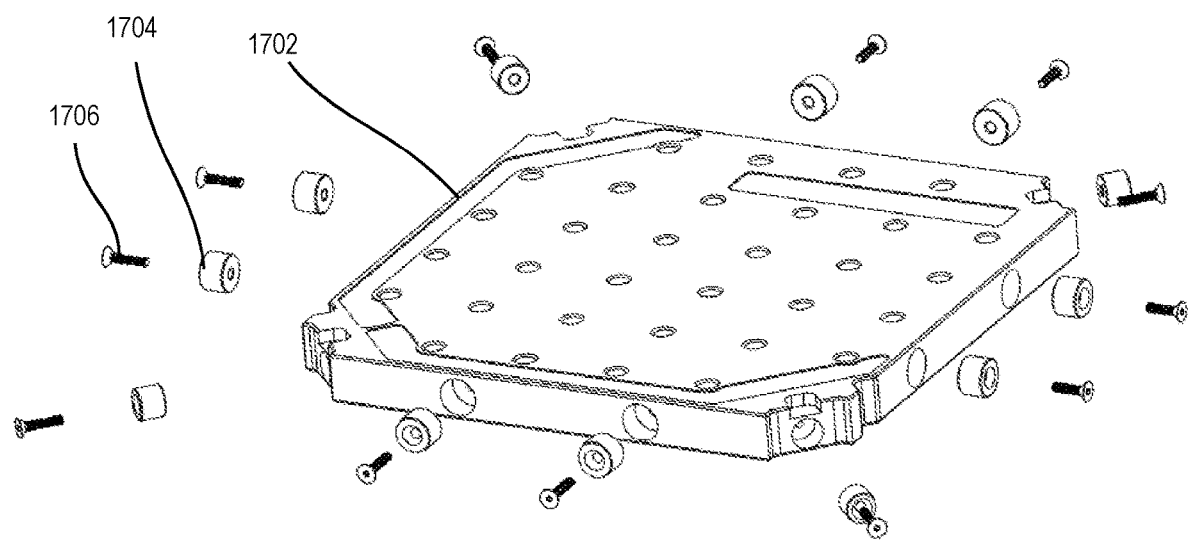
FIGS. 17A-17D depict magnets for use in a modular fixture plate system, in embodiments.
Figure 17B:
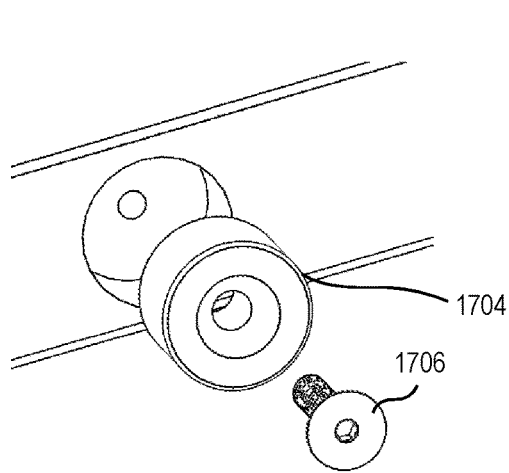
Figure 17C:
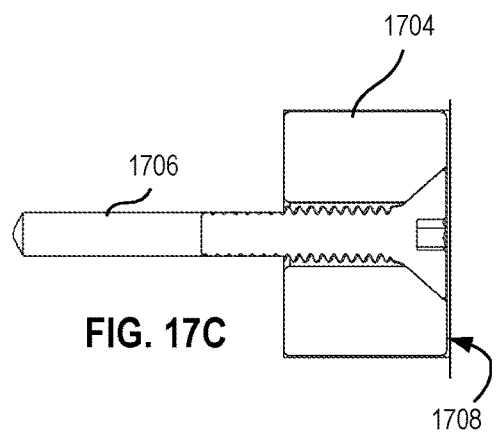
Figure 17D:
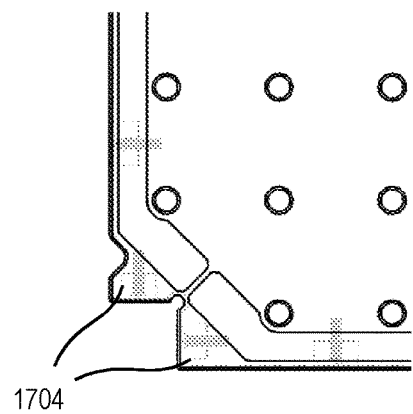

FIGS. 17A-17D depict magnets for use in a modular fixture plate system, in embodiments. FIG. 17A depicts an exploded view fixture plate 102 and magnets 1704. FIG. 17B depicts a detailed exploded view of magnet 1704 and screw 1706. FIG. 17C depicts a side cross-sectional view of magnet 1704 and screw 1706. Screws 1706 are countersunk in magnets 1704 so the magnets are flush with a surface of side edge 1708 of a fixture plate. Generally, magnets 1704 are mounted in recessed corners of a fixture plate 1702, and at intervals along all side edges of fixture plate 1702. The number of magnets 1704 in a side edge varies depending on the dimensions of the fixture plate. While FIG. 17A depicts magnet placement in a fixture plate with a chamfered corner contour, FIG. 17D depicts a hidden line view of a fixture plate with a square corner contour where a magnet 1704 is mounted in both corner faces. In embodiments, magnets 1704 may also be secured using glue or a snap ring.

Magnets 1704 may be colored coded to signify polarity of the magnets. In embodiments, magnets with the same polarity are positioned on the bottom/left and top right of a fixture plate. This configuration allows an entire plate to turn 90 degrees and still connect magnetically—plates can be used in 2 orientations instead of just one as magnets are positioned on all 4 sides of a fixture plate instead of just 2 sides.

Magnets are used herein to securely and flexibly retain various components against each other. Magnets may be used to retain fixture plates against a rail, each other, a keystone or a corner dock. Components disclosed herein may be magnetically attached to magnetic metal components. Further, flat-head screws or bolts made from magnetic SS, black oxide steel or other ferrous magnetic materials could be provided to retain components against surfaces that contain magnets.

Alternate Plate Embodiments

Embodiments are described thus far in terms of square fixture plates with four recessed corners a grid of evenly spaced threaded holes. In embodiments, fixture plates may have dimensions of approximately 150 mm/6 in, 300 mm or 12 in and 450 mm/19 in, although many dimensions are contemplated. The number threaded holes may vary based on the dimensions of the fixture plate. Threaded holes may be placed in a regular grid or in any irregular arrangement according to an intended use of the fixture plate. Threaded holes may fully or partially cover a working surface of a fixture plate. Threaded holes may have many dimensions, including M4, M6, M8, M10, M12, ¼-20, and ⅜-16, for example. Many other configurations of fixture plates are encompassed within the principles described herein.

Figure 18A:
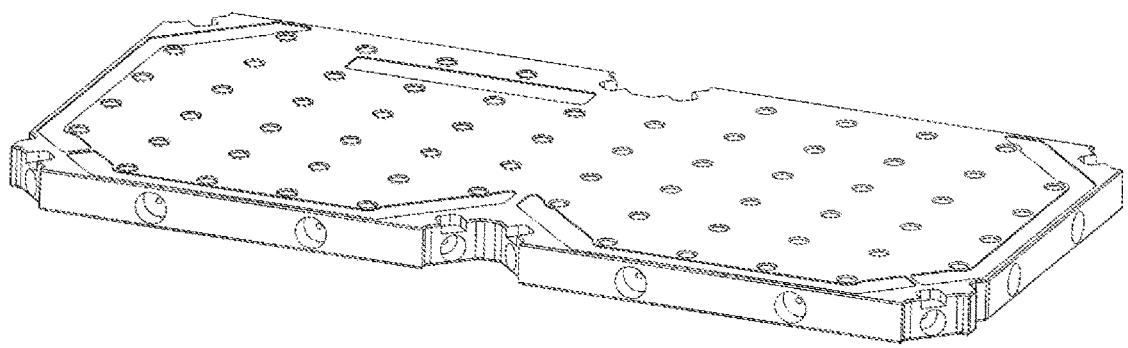
FIGS. 18A-18C depict alternative fixture plates for use in a modular fixture plate system, in embodiments.
Figure 18B:
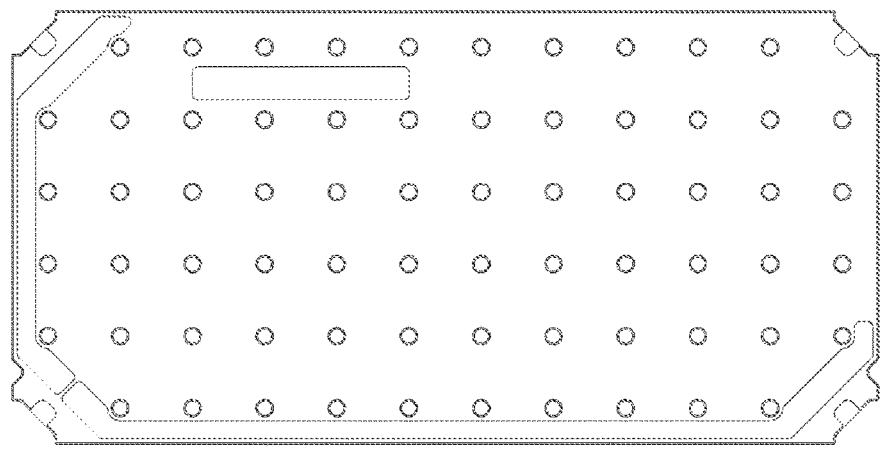
Figure 18C:
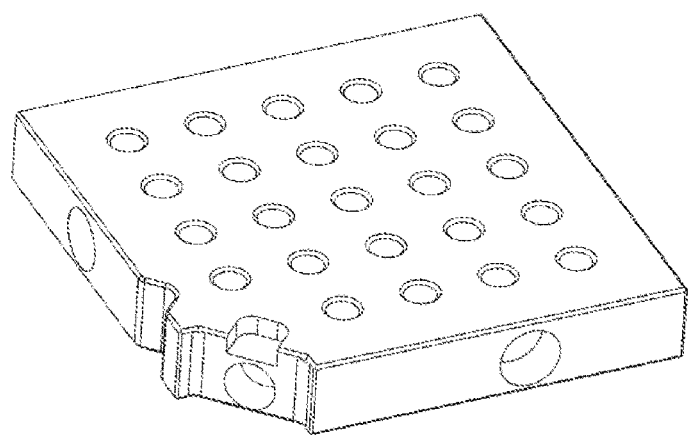

FIGS. 18A-18C depict alternative fixture plates for use in a modular fixture plate system, in embodiments. FIGS. 18A and 18 B depict similar non-square fixture plates that are symmetric about one axis. The fixture plate of FIG. 18A includes a central notch for use with a keystone as explained above for recessed corners in square fixture plates. FIG. 18B depicts a similar fixture plate with no notch. This type of fixture plate may be useful for processes using longer parts, for example. FIG. 18C depicts a mini-plate with only one corner. This plate may be useful for processing a series of small parts quickly and flexibly.

Figure 19A:
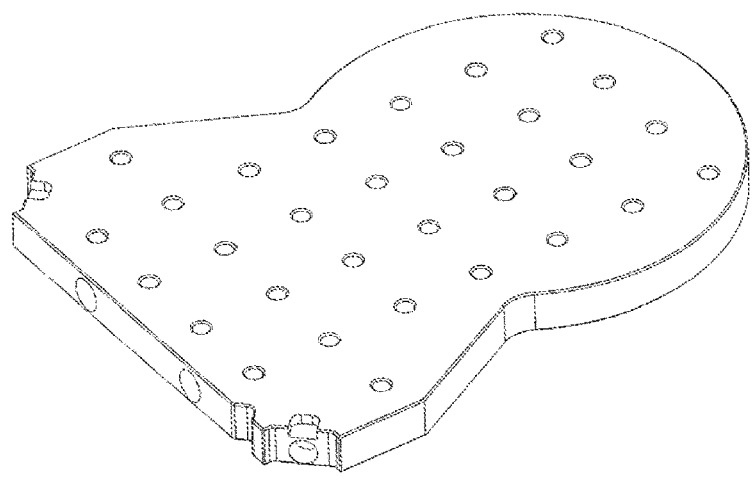
FIGS. 19A-19C depict more alternative fixture plates for use in a modular fixture plate system, in embodiments.
Figure 19B:
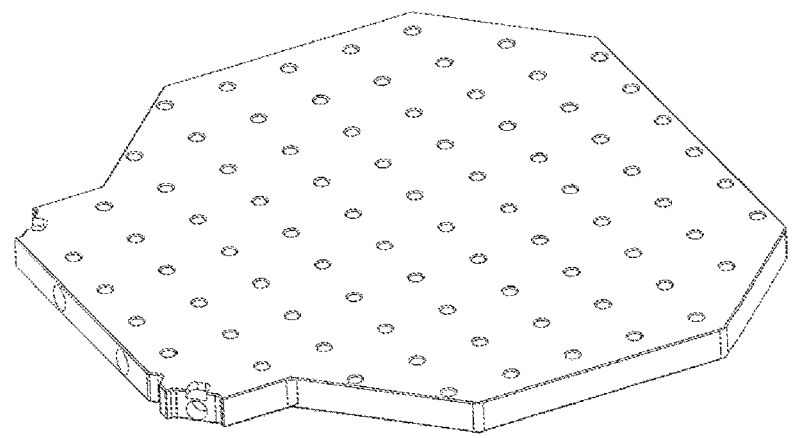
Figure 19C:
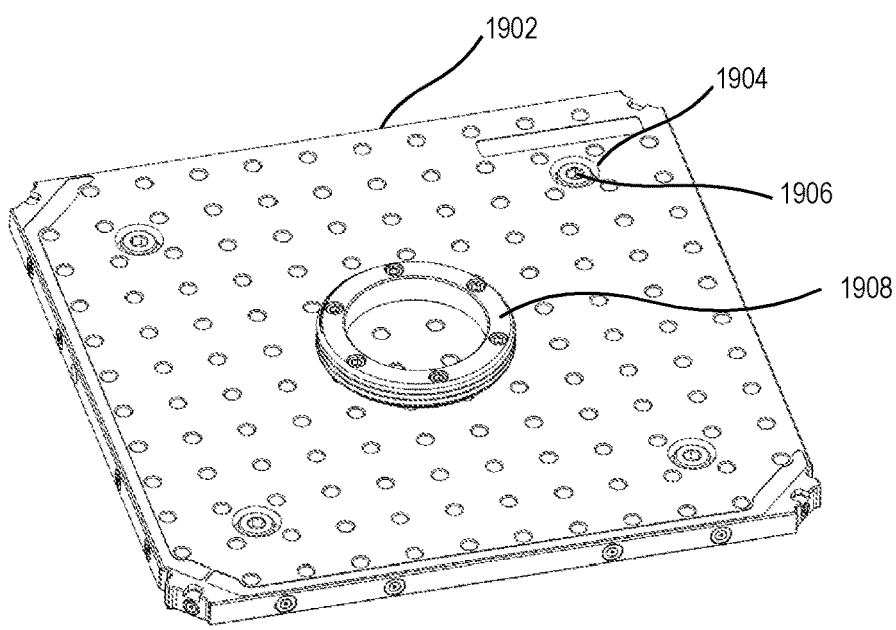

FIGS. 19A-19C depict more alternative fixture plates for use in a modular fixture plate system, in embodiments. FIG. 19A depicts a fixture plate with two recessed corners for docking on one side where the dimensions on the opposite side are narrower than on the docking side. Conversely, FIG.

19B depicts a fixture plate with two recessed corners for docking on one side where the dimensions on the opposite side are wider than on the docking side. Although specific geometries are depicted in FIGS. 19A and 19B, many others are contemplated so as to provide flexibility in accommodating many different sizes and shapes of worksurfaces and tooling arrangements.

FIG. 19C depicts a square fixture plate 1902 with four counterbores 1904 for using screws or bolts 1906 to attach fixture plate 1902 to a work surface. In embodiments, more or fewer counterbores may be provided. Counterbores provide for bolting the entire plate down with the head of bolt 1906 flush with or below the top of the plate. Thus bolts 1906 will not interfere with part being measures or manufactured the sits flat on the top surface of fixture plate 1902. In embodiments, fixture plate 1902 may include a mounting ring 1908 or other mounting geometry for attaching a manufacturing or measuring device such as a marking laser, machining robot, CMM or machine tool. Fixture plate 1902 may also be used as a docking station for other fixture plates as described herein. In yet another embodiment, fixture plate 1902 may be used with mounting ring 1908 without being bolted to a worksurface.

Figure 19D:
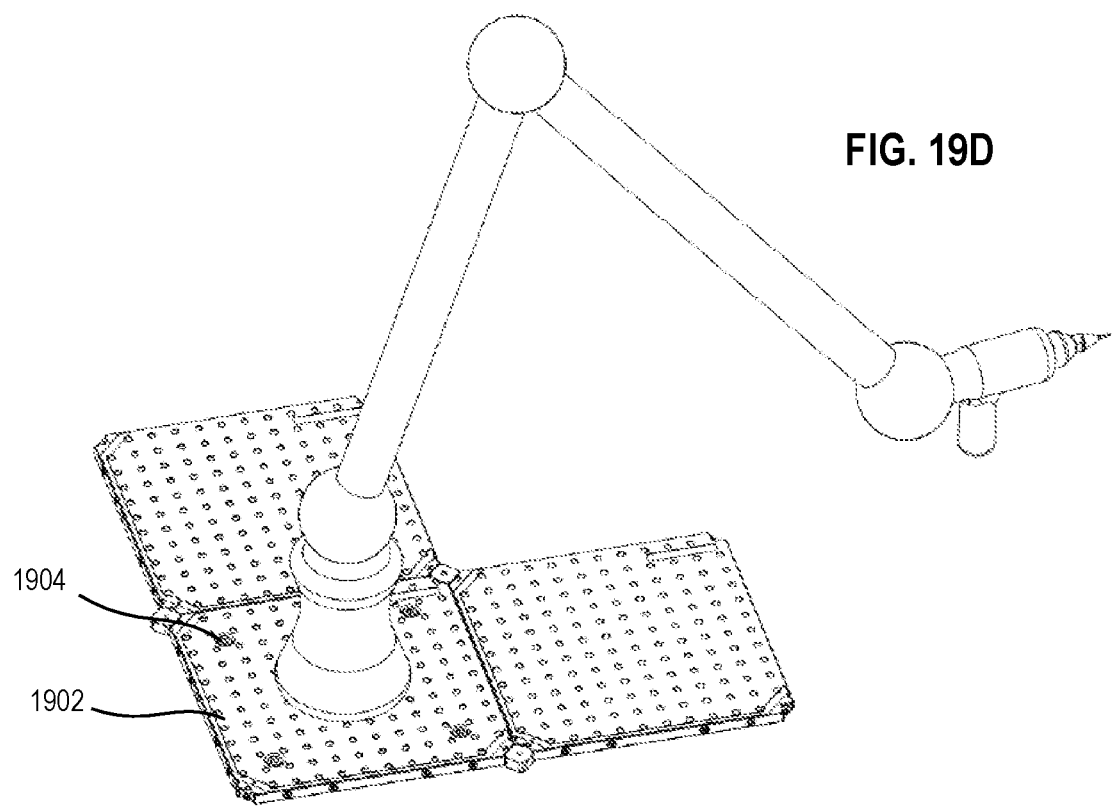
FIGS. 19D and 19E depict the fixture plate of FIG. 19C in use with an apparatus, in embodiments.
Figure 19E:
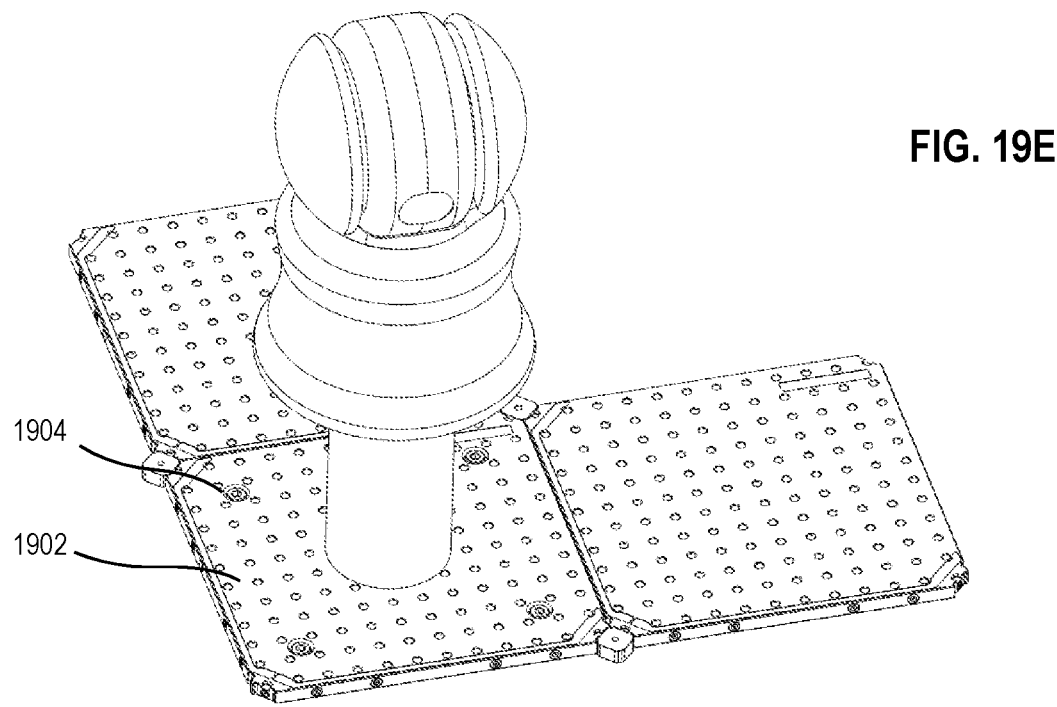

FIGS. 19D and 19E depict the fixture plate of FIG. 19C in use with an apparatus, in embodiments. FIG. 19D shows a portable CMM measuring arm mounted to fixture plate 1902. FIG. 19E shows a non-contact measuring device such as a laser tracker mounted to fixture plate 1902. These devices are representative of many different devices that may be mounted on a fixture plate. The mounting mechanism may be a ring as shown in FIG. 19C, or any appropriate structure that will retain a device in place on a fixture plate. In either FIG. 19D or 19E, counterbores 1904 are optional. Although two additional fixture plates are shown adjacent to fixture plate 1902 in both FIGS. 19D and 19E, any number of fixture plates corresponding to any of the layouts. FIGS. 1-3 and 22 are representative, but any layout shown or described herein may be used. Parts to be worked on or other devices may be mounted on adjoining fixture plates in any configuration.

Figure 20A:
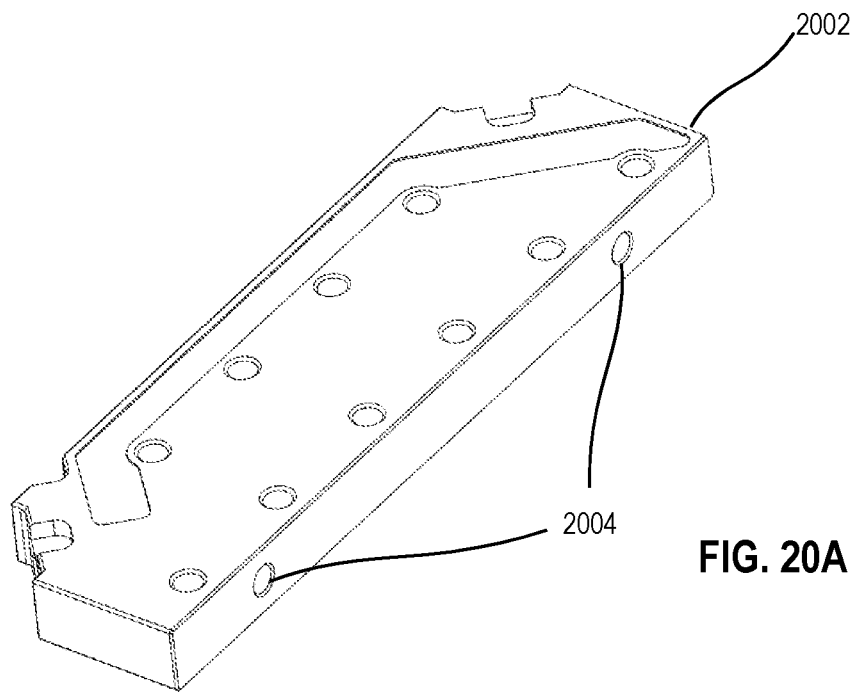
FIGS. 20A-20B are perspective views of adapter plates for use in a modular fixture plate system, in embodiments.
Figure 20B:
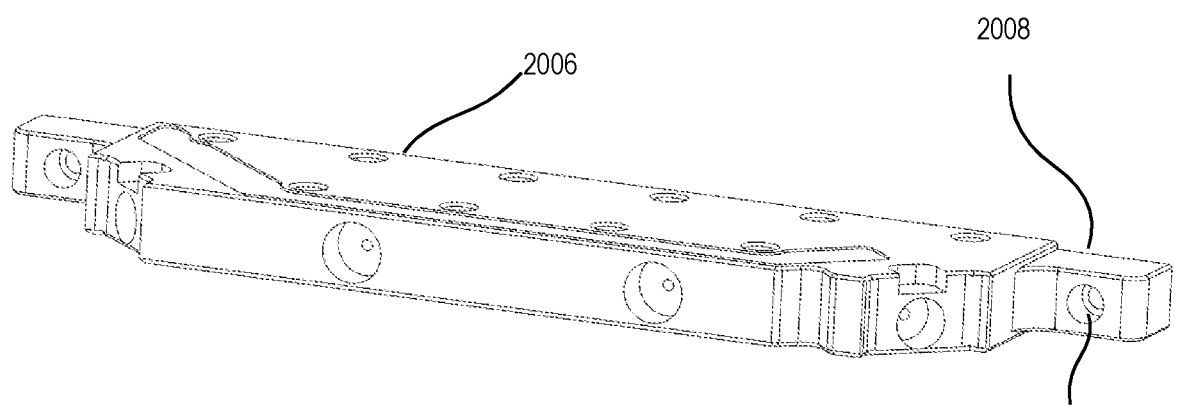

FIGS. 20A-20B are perspective views of adapter plates that may be used to adapt other fixture plates for use with the fixture plates and keystones disclosed herein. FIG. 20A depicts an adapter plate 2002 with female threaded holes 2004 to accept bolts from a fixture plate having holes with a corresponding spacing. FIG. 20B depicts an adapter plate 2006 with tabs 2008 having counterbores 2010 that may be used with screws to attach adapter plate 2006 to another fixture plate. Adapter plate 2006 may also be provided with threaded holes 2004 (not visible in FIG. 20B) to provide increased flexibility.

Figure 21:
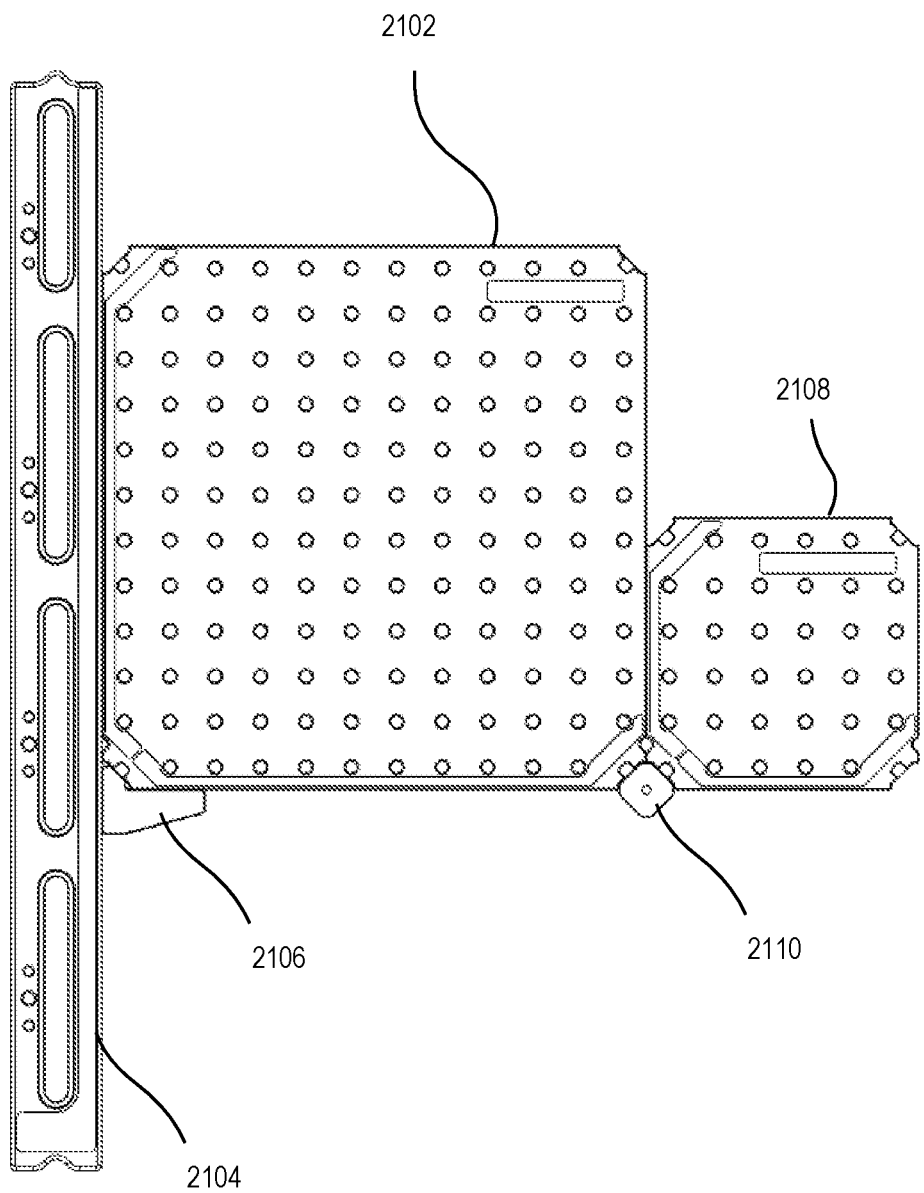
FIG. 21 is a top view of a modular fixture plate system using different sized fixture plates, in embodiments.

FIG. 21 is a top view of a modular fixture plate system using different sized fixture plates, in embodiments. The modular fixture plate system of FIG. 21 includes fixture plate 2102 docked to rail 2104 and hard stop 2106. A second fixture plate 2018 having different dimensions that fixture plate 2102 is attached to fixture plate 2102 using keystone 2110. Although FIG. 21 depicts components using a chamfered corner contour, components using a square corner contour or any other type may also be used. In embodiments, fixture plate 2108 may be rotated 90 degrees and attached to fixture plate 2102 in the same position or at a different location adjacent to fixture plate 2102. Further, any of the fixture plates disclosed herein may be included in this embodiment.

Figure 22:
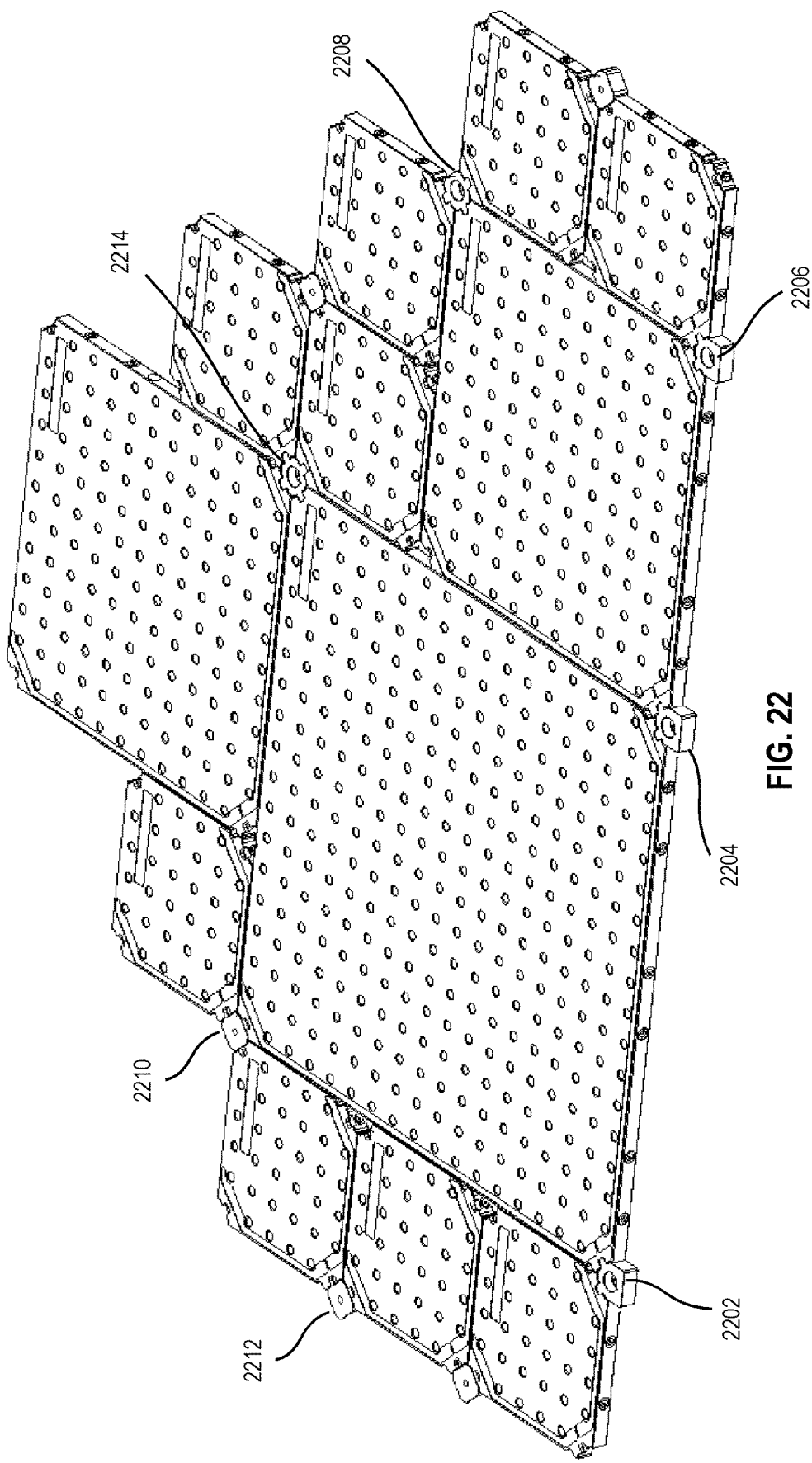
FIG. 22 is a perspective view of a modular fixture plate system that does not require a rail, in embodiments.

FIG. 22 is a perspective view of a modular fixture plate system that does not require a rail, in embodiments. As shown in FIG. 22, a plurality of keystones 2202, 2204, 2206 and 2208 have counterbores for attaching to a worksurface and retaining fixture plates securely. Additional keystones just as those shown at 2210, 2212 and 2214 may be used to provide the layout shown in FIG. 22. Although some keystones in FIG. 22 are shown with counterbores and some are shown without, this is not limiting and any of the keystones of one type may be exchanged for the other type. In addition, keystones may be held securely on a worksurface magnetically instead of through the use of bolts or screws. The modular fixture plate system of FIG. 22 includes fixture plates of two different sizes but any of the fixture plates disclosed herein may be incorporated in a system without a rail.

Alternate Keystone Embodiments

Figures 23A, 23B:
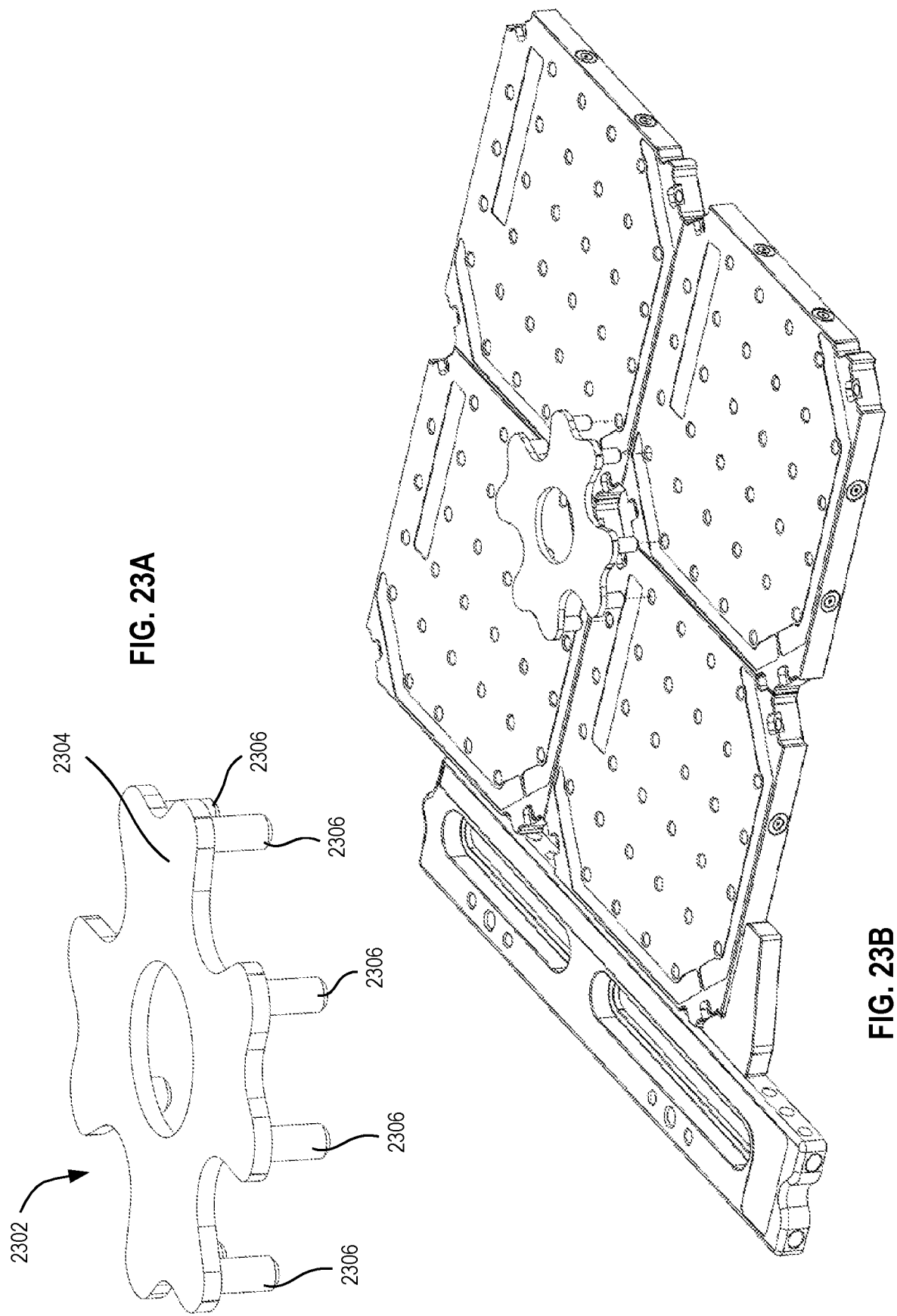
FIGS. 23A-23B are perspective views of a keystone cap for use with a modular fixture plate system, in embodiments.

FIGS. 23A-23B are perspective views of a keystone cap 2302 for use with a modular fixture plate system, in embodiments. FIG. 23A depicts a keystone cap 2302 with an upper surface 2304 and a plurality of prongs 2306 extending perpendicularly from upper surface 2304. In embodiments, there are eight prongs, two from each lobe of upper surface 2304 but any number may be provided. Prongs 2306 may be fitted into existing threaded holes on fixture plates as shown in FIG. 23B. Additionally, special purpose holes or recesses may be provided in the fixture plates. In embodiments, upper surface 2304 may have holes in place of prongs 2306 and may be attached to fixture plates using bolts or screws. Keystone cap 2302 is shown connecting four fixture plates but any number may be used. Keystone cap 2302 may be made of hard rubber, plastic or metal, for example.

Figure 24A:
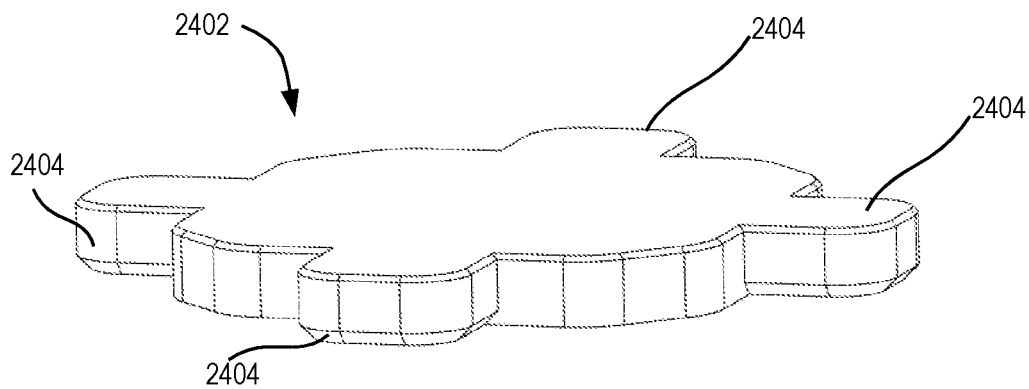
FIGS. 24A-24B are perspective views of a thin keystone for use with a modular fixture plate system, in embodiments.
Figure 24B:
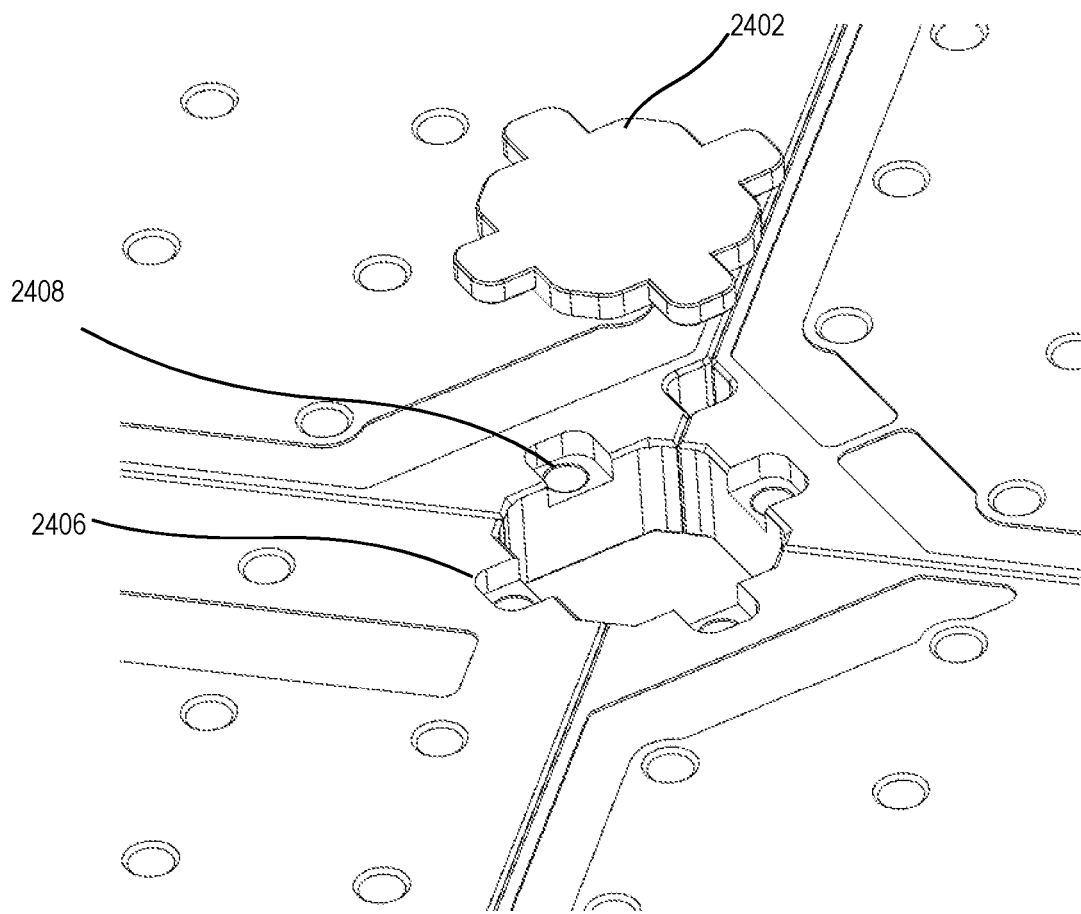

FIGS. 24A-24B are perspective views of a thin keystone 2402 for use with a modular fixture plate system, in embodiments. FIG. 24A depicts thin keystone 2402 which includes tabs 2404 for inserting into tab cutout 2406, similar to tab cutout 602 of FIG. 6. In embodiments, the recessed corners of FIG. 24B include magnets 2408 in tab cutouts 2406 instead of in a corner face of the recessed corner. Magnets 2408 engage with tabs 2404 in thin keystone 2402.

Figure 25:
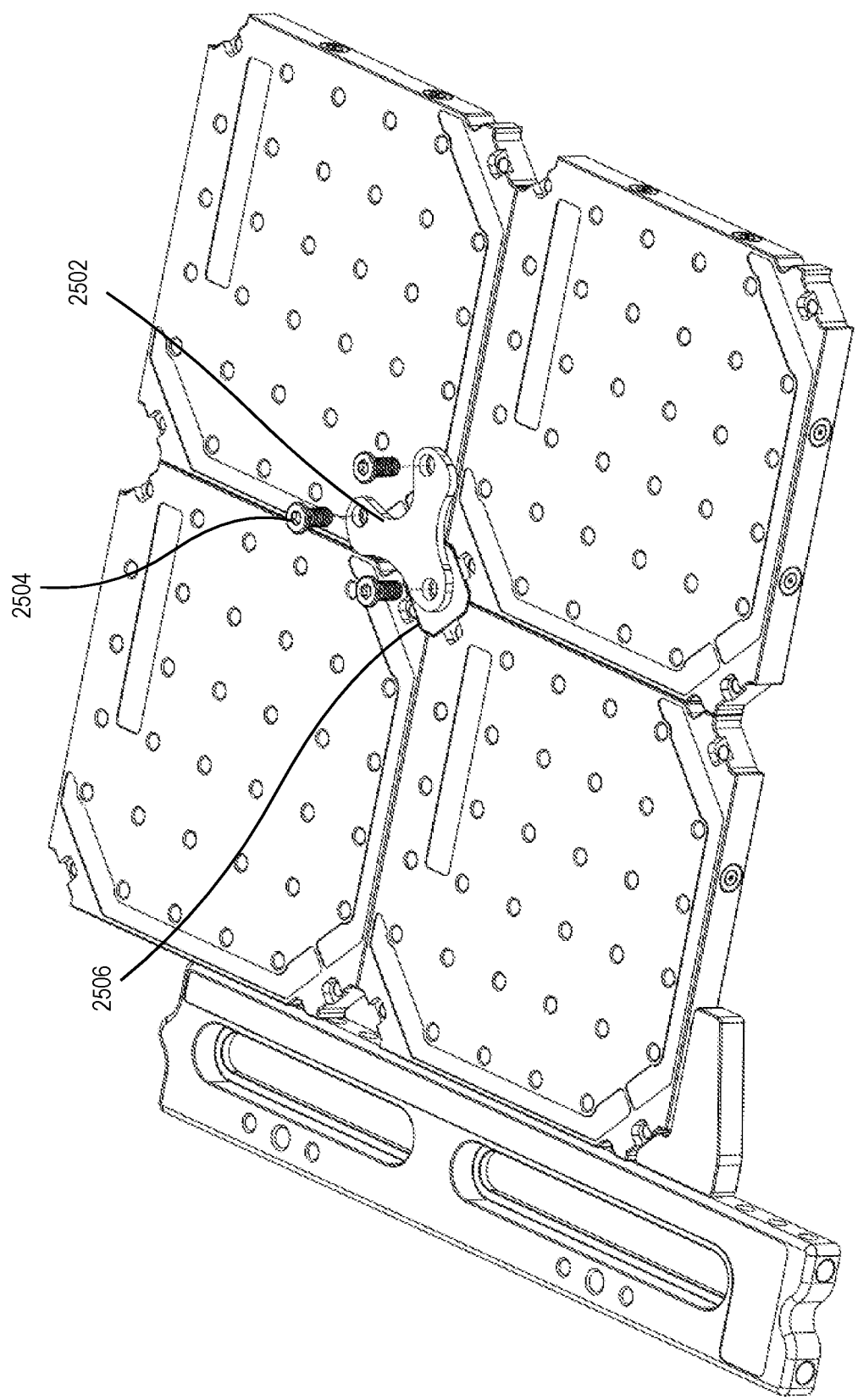
FIG. 25 is a perspective view of a bolt-on keystone keeper for a modular fixture plate system, in embodiments.

FIG. 25 is a perspective view of a bolt-on keystone keeper 2502 for a modular fixture plate system, in embodiments. As depicted in FIG. 25, keystone keeper 2502 is generally triangular with three lobes, each with a hole for using screws or bolts 2504 to attach keystone keeper 2502 to fixture plates. In embodiments, one lobe of keystone keeper 2502 may be attached to keystone 2506 and the other two may be attached to one or more fixture plates, depending on the positioning of keystone keeper 2502. Other shapes may also be used for keystone keeper 2502 such as shapes with two, four or five lobes, for example. In embodiments, keystone keeper is used in robotic automation applications when a robot is moving and placing the plates.

Figure 26:
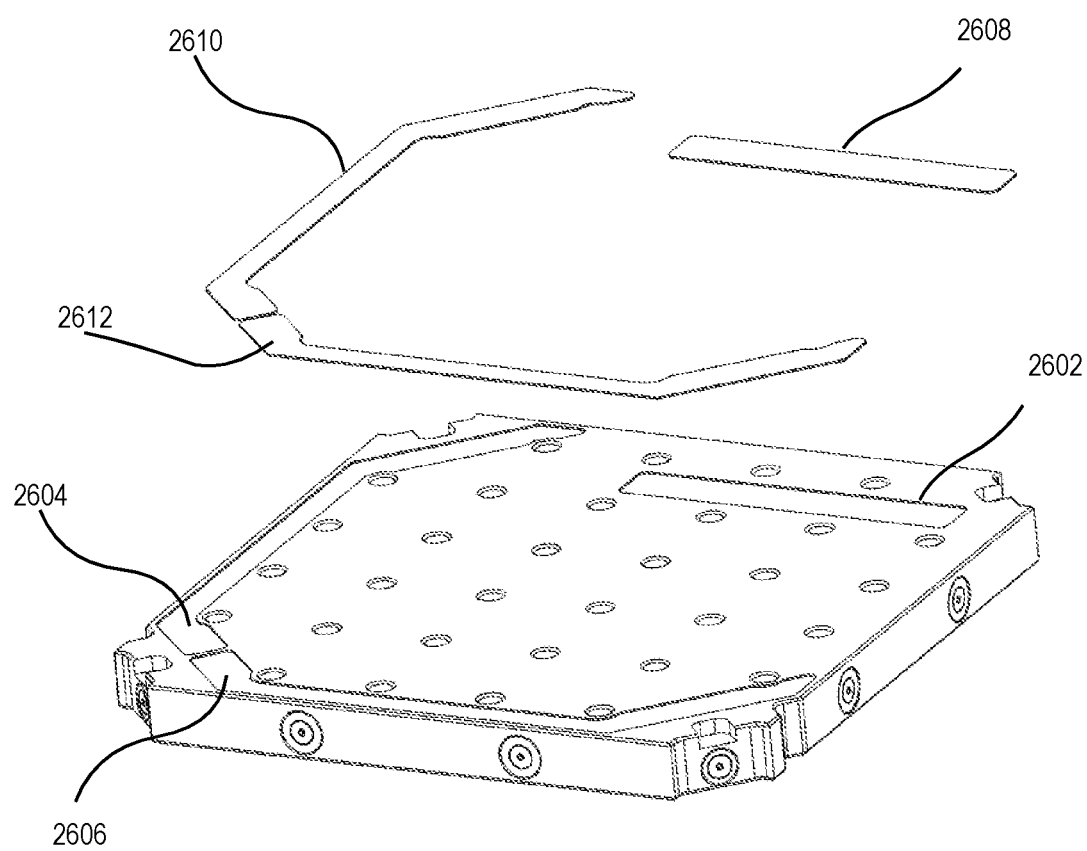
FIG. 26 is an exploded view of recessed areas and decals for a modular fixture plate system, in embodiments.

FIG. 26 is an exploded view of recessed areas and decals for a modular fixture plate system, in embodiments. A fixture plate representing any of the fixture plates disclosed herein includes recessed areas 2602, 2604 and 2606 which are shaped and sized to receive decals 2608, 2610 and 2612, respectively. Decals 2610 and 2612 may include various indicia such as dimensions in mm or inches, or hole numbers, for example. Decal 2608 may include indicia such as a company name or logo and/or a name of a fixture plate. Decals 2608, 2610 and 2612 may have different colors distinguishing between different hole sizes or other features of fixture plates, in embodiments. Using decals to number holes is significantly easier and less time-consuming than either engraving numbers on the plate and paint filling them or laser marking them, which may not even be feasible on large plates.

Figure 27:
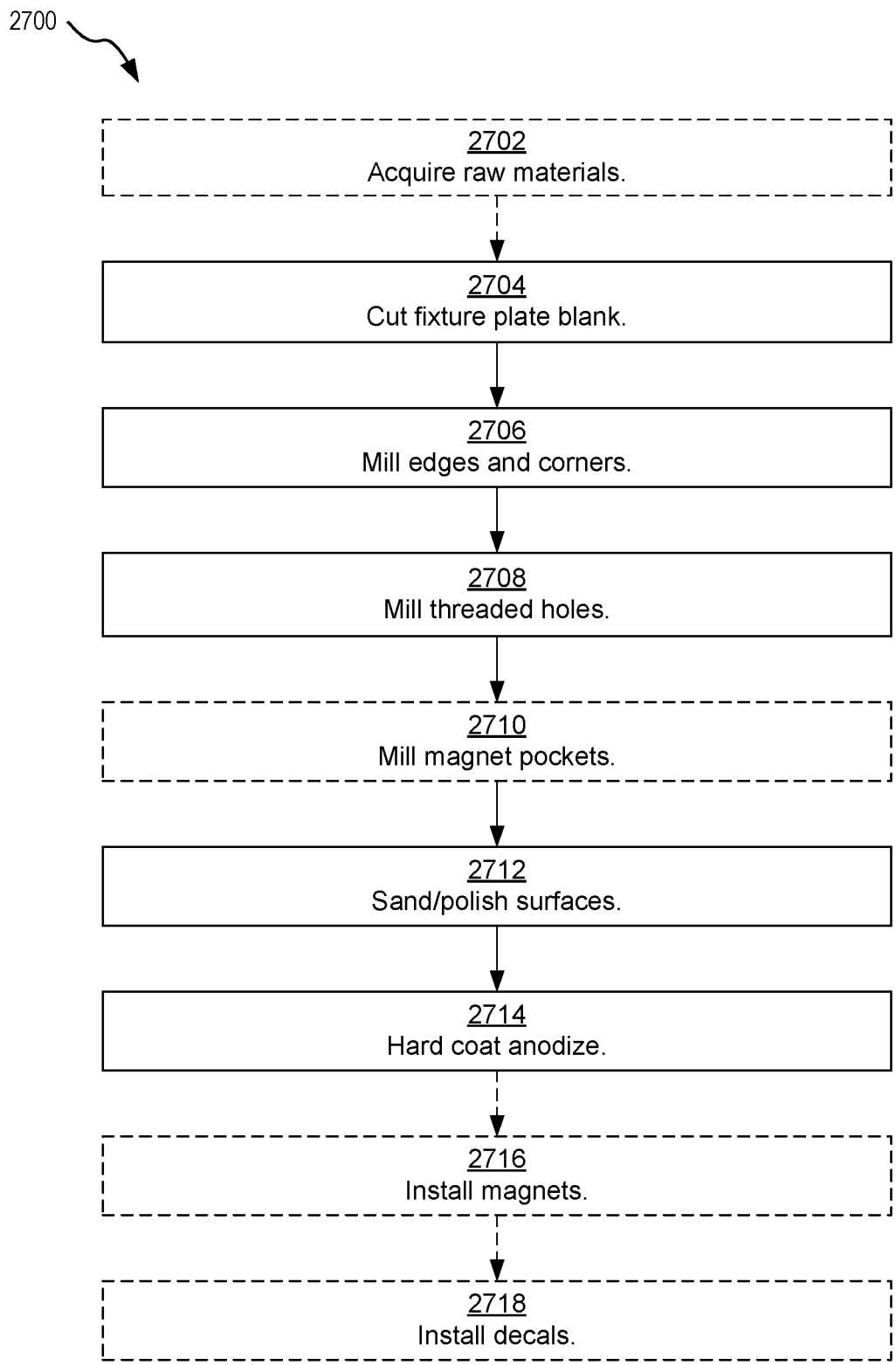
FIG. 27 is a flowchart depicting a method manufacturing a fixture plate, in embodiments.

FIG. 27 is a flowchart depicting method 2700 manufacturing a fixture plate or keystone as shown and described herein. Method 2700 includes steps 2704-2708 and 2712-2714. In embodiments, method 2700 also includes at least one of steps 2702, 2710, 2716 or 2718.

Step 2702 includes acquiring raw materials. In an example of step 2702, fixture plates and keystones in a modular fixture plate system may be made from aluminum, acrylic, magnetic stainless steel or other materials that meet the needs of a particular manufacturing or inspection process and is a flat material between approximately 0.125 and 2 inches thick. In embodiments, fixture plates and keystones may have different thicknesses.

Step 2704 includes cutting the raw material into fixture plate or keystone blanks. In an example of step 2704, the cutting step may use a saw, waterjet or laser to cut the raw material. Fixture plates may be cut in squares, rectangles, or any of the shapes disclosed herein.

Step 2706 includes milling the edges of the cut fixture plates and keystones. In an example of step 2706, a number of edges and corners appropriate to the design of the fixture plate or keystone will be milled. For example, a square fixture plate 102 as shown in FIG. 4 will be milled on four edges and four recessed corners 116. Recessed corners 116 may be chamfered as shown in FIG. 4 or square as shown in FIG. 8. Recessed corners may have any shape to match an associated keystone that has 90-degree rotational symmetry as described herein. Fixture plates may also be milled to have other shapes such as those shown in FIGS. 19A and 19B. In this type of fixture plate, there may be one or two recessed corners of any profile. Other features may be milled in recessed corners 116, such as tab cutouts 602 of FIG. 6 or recessed areas 2602, 2604 and 2606 for receiving decals in FIG. 26. Square keystone 902 may be milled to a square shape while chamfered keystone 118 may be milled to have a generally square shape with chamfered corners.

Step 2708 includes milling threaded holes 108 in a top surface of a fixture plate. In an example of step 2708, threaded holes 108 may be milled in a regular grid pattern or an irregular pattern as needed. More or fewer threaded holes 108 may be milled in a given fixture plate. In embodiments, a keystone may also be milled with a threaded hole 908 or counterbore 506.

Step 2710 includes milling magnet pockets in one or more side edges 114 of a fixture plate 102 to retain magnets 406. In an example of step 2710, the number of magnet pockets milled in a fixture plate is influenced by the shape and dimensions of the fixture plate. In embodiments, magnets are not required for a modular fixture plate system for some uses. Further, a keystone may be milled with magnet pockets or may be made of a magnetic material in some embodiments.

Step 2712 includes sanding or polishing the fixture plate and keystone. In an example of step 2712, the top of the fixture plate or keystone may to sanded with a rotary head sander, for example, to ensure a flat, burr-free surface. The edges and bottom of a fixture plate or keystone may also be sanded, as needed.

Step 2714 includes a hard coat anodization process to improve durability. In embodiments, fixture plates made of acrylic, for example, would not undergo this step. Step 2716 includes installing magnets in the magnet pockets milled in step 2710.

Figure 28:
FIG. 28 is a flowchart depicting a method of performing a process using a modular fixture plate system, in embodiments.

Step 2718 includes installing decals. In an example of step 2718, decals 2608, 2610 and 2612 are placed in recessed areas 2602, 2604 and 2606. Decals may include various indicia such as dimensions in mm or inches, hole numbers, a company name or logo and/or a name of a fixture plate. In embodiments, other means to provide labels on a top surface of a fixture plate may be used, such as engraving and paint filling labels or laser marking, FIG. 28 is a flowchart depicting a method 2800 of performing a process using a modular fixture plate system, in embodiments. Method 2800 includes steps 2804, 2808 and 2810. In embodiments, method 2800 also includes at least one of steps 2802, 2806 or 2814.

Step 2802 includes installing rail 1002 on a work surface. In an example of step 2802, the rail may be bolted to a work surface.

Step 2804 includes installing a docking piece or master plate. In an example of step 2804, one or more fixture plates may be secured to a rail using hard stop 1006 to serve as a master plate. In embodiments, one or more corner docks as disclosed herein may be used to secure a fixture plate instead of or in addition to rail 1002. In further embodiments, a fixture plate may be directly secured to a worksurface using bolts 1906 in counterbores 1904, for example. In other embodiments, a fixture plate may be used as a master plate without securing it to the work surface. Step 2806 includes installing a manufacturing or inspection device on a fixture plate. In embodiments, the device may be installed on any fixture plate in the modular fixture plate system, including one docked to a docking piece, to the rail, to another fixture plate, bolted to the surface directly, or an unsecured fixture plate. In embodiments, a manufacturing or inspection device may be mounted to a work surface with a different mechanism, such as a gantry or other support structure.

Step 2808 includes installing parts on fixture plates. In an example of step 2808, fixturing components may be added to a fixture plate using threaded holes 108. The fixturing components may be positioned to hold a specific part of manufacturing and/or inspection.

Step 2810 includes mating a fixture plate to a docking piece or master plate. In an example of step 2810, a fixture plate can be loaded with a part, then mated to the docking piece, rail or master plate for a manufacturing and/or inspection process.

Step 2812 includes chaining plates as necessary across a work surface. In an example of step 2812, a modular fixture plate system may be assembled in a wide variety of layouts, as shown, in FIGS. 1, 2, 3, 12C, 15D, 16, 19D, 19E, 21, 22, 23B and 25, for example. Many other layouts are possible, as described herein.

Step 2814 includes performing a manufacturing and/or inspection process on a succession of parts. In an example of step 2814, a work session may include performing the same process on multiple identical parts. More than one fixture plate may be prepared with fixturing components such that a first fixture plate can be loaded with a part, then mated to the docking piece, rail or master plate for a manufacturing and/or inspection process according to step 2810. During this process, a second fixture plate with identical fixturing components may be set up with the next part, then swapped with the first fixture plate. Any number of fixture plates may be prepared with fixturing components for use with the modular fixture plate system.

Combinations of Features

Features described above as well as those claimed below may be combined in various ways without departing from the scope hereof. The following enumerated examples illustrate some possible, non-limiting combinations:

(A1) A modular fixture plate system includes a first fixture plate with a top surface; a plurality of side edges, each side edge perpendicular to the top surface and at least two adjoining side edges of the plurality of side edges perpendicular to each other; and at least one recessed corner between the two adjoining side edges having a corner contour; and a keystone comprising a shape with 90-degree rotational symmetry and a keystone contour corresponding to the corner contour, wherein the first fixture plate may be mated with a second fixture plate using the keystone.

(A2) In system (A1), each side edge and recessed corner may include at least one magnet embedded in the side edge and the keystone may include a ferromagnetic material which is magnetically attached to the recessed corner of the first fixture plate.

(A3) In system (A1) or (A2), the corner contour includes an interior chamfer formed at approximately a 45-degree angle with first and second adjoining side edge; a first face between the interior chamfer and the first adjoining side edge, and perpendicular to the first adjoining side edge; and a second face between the interior chamfer and the adjoining second side edge, and perpendicular to the second adjoining side edge.

(A4) In system (A3), the keystone contour is a square with chamfered corners.

(A5) In system (A3) the keystone further comprises a ferromagnetic material and the interior chamfer further comprises a magnet for magnetically attaching to the keystone.

(A6) In system (A5), the keystone is made from aluminum and includes a ferromagnetic material embedded in the keystone contour for magnetically attaching to the magnet in the interior chamfer.

(A7) In any of systems (A1)-(A6), the corner contour comprises a right angle formed by a first corner face perpendicular to a first side edge and a second corner face perpendicular to the first corner face and a second side edge; and the keystone contour is a square.

(A8) In any of systems (A1)-(A7), the corner contour is a quarter circle and the keystone contour is a circle.

(A9) In any of systems (A1)-(A8), the top surface of the first fixture plate further comprises a tab cutout adjacent to at least one of the recessed corners; and the keystone further comprises at least one tab extending away from a top surface of the keystone and adapted to be received by the tab cutout.

(A10) In system (A9), the keystone further comprises a counterbore for receiving a threaded fastener for attaching the keystone to a worksurface as a docking station for a fixture plate.

(A11) In any of systems (A1)-(A10), the system includes a rail adapted to be attached to a worksurface to serve as a docking station for the first fixture plate, said rail comprising a top and side, said side comprising a plurality of holes spaced approximately 10-20 mm apart along a length of the side; and a hard stop comprising two or more pins adapted to be inserted in two or more holes in the side of the rail and one or more magnets adjacent to the pins for magnetically attaching to the rail.

(A12) In system (A2), a third fixture plate magnetically attached to one or both of the first and second fixture plates.

(A13) In any of systems (A1)-(A12), the top surface further comprises a plurality of recessed areas for receiving decals displaying indicia.

(B1) A fixture plate for a modular fixture plate system includes a top surface comprising a geometric shape; a plurality of side edges, each side edge perpendicular to the top surface; and one or more recessed corners having a corner contour between adjacent side edges, said one or more recessed corners receiving a keystone comprising a shape with 90-degree rotational symmetry and a keystone contour corresponding to the corner contour.

(B2) The fixture plate of (B1) wherein each side edge and one or more recessed corners includes at least one magnet embedded in the side edge and the keystone includes a ferromagnetic material which is magnetically attached to the one or more recessed corner of the fixture plate.

(B3) The fixture plate of either (B1) or (B2), wherein the shape is a square or a rectangle.

(B3) The fixture plate of any of (B1)-(B3), wherein the shape is an irregular shape and at least one side edge is curved.

(C1) A method of performing a process on a part using a modular fixture plate system comprising: a first fixture plate having a top surface and a plurality of side edges, each side edge perpendicular to the top surface and at least two adjoining side edges of the plurality of side edges perpendicular to each other and at least one recessed corner between the two adjoining side edges having a corner contour; and a keystone comprising a shape with 90-degree rotational symmetry and a keystone contour corresponding to the corner contour, wherein the first fixture plate may be mated to a second fixture plate using the keystone, the method including installing the first fixture plate on a worksurface; installing a part to be processed on a second fixture plate using fixturing components; mating the second fixture plate to the first fixture plate using the keystone.

(C2) The method of (C1), including installing a second part to be processed on a third fixture plate using fixturing components; and detaching the second fixture plate from the first fixture plate and replacing it with the third fixture plate.

(C3) The method of either of (C1) or (C2), including mating a plurality of fixture plates to the first fixture plate.

Changes may be made in the above methods and systems without departing from the scope hereof. For example, principles disclosed herein may be used with vision system plates made of a transparent plastic such as polycarbonate or acrylic. This type of plate would have threaded holes, recessed corners and magnets as described herein. Fixture plates may be produced from tooling plate-grade aluminum and black anodized for durability. An XLF (Extra Low Friction) coating for reduced friction and increased abrasion resistance may be added to any of the components described herein.

It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:
1. A modular fixture plate system comprising:
a first fixture plate comprising:
a top surface;
a plurality of side edges, each of the side edges extending perpendicular to the top surface and at least two adjoining side edges of the plurality of side edges perpendicular to each other; and at least one recessed corner between the two adjoining side edges having a corner contour; and a keystone comprising a shape with 90-degree rotational symmetry and a keystone contour corresponding to the corner contour, wherein the first fixture plate is matable with a second fixture plate using the keystone;

wherein each of the side edges and the at least one recessed corner further comprises at least one magnet embedded in the side edge and the keystone further comprises a ferromagnetic material which is magnetically attached to the at least one recessed corner of the first fixture plate.

2. The modular fixture plate system of claim 1, wherein the corner contour comprises:

an interior chamfer formed at approximately a 45-degree angle with first and second adjoining side edges of the plurality of side edges;

a first face between the interior chamfer and the first adjoining side edge, and perpendicular to the first adjoining side edge; and a second face between the interior chamfer and the adjoining second side edge, and perpendicular to the second adjoining side edge.

3. The modular fixture plate system of claim 2, wherein the keystone contour is a square with chamfered corners.

4. The modular fixture plate system of claim 2, wherein the interior chamfer further comprises a magnet for magnetically attaching to the keystone.

5. The modular fixture plate system of claim 4, wherein the keystone is made from aluminum and the ferromagnetic material is embedded in the keystone contour for magnetically attaching to the magnet in the interior chamfer.

6. The modular fixture plate system of claim 1, wherein:

the corner contour comprises a right angle formed by a first corner face perpendicular to a first side edge of the plurality of side edges and a second corner face perpendicular to the first corner face and a second side edge of the plurality of side edges; and the keystone contour is a square.

7. The modular fixture plate system of claim 1, wherein the corner contour is a quarter circle and the keystone contour is a circle.

8. The modular fixture plate system of claim 1, wherein:

the top surface of the first fixture plate further comprises a tab cutout adjacent to at least one of the at least one recessed corner; and the keystone further comprises at least one tab extending away from a top surface of the keystone and adapted to be received by the tab cutout.

9. The modular fixture plate system of claim 8, wherein the keystone further comprises a counterbore for receiving a threaded fastener for attaching the keystone to a worksurface as a docking station for a fixture plate.

10. The modular fixture plate system of claim 1, further comprising:

a rail adapted to be attached to a worksurface to serve as a docking station for the first fixture plate, said rail comprising a top and side, said side of the rail comprising a plurality of holes spaced approximately 10-20 mm apart along a length of the side of the rail; and a stop comprising two or more pins adapted to be inserted in two or more holes in the side of the rail and one or more magnets adjacent to the pins for magnetically attaching to the rail.

11. The modular fixture plate system of claim 1, further comprising:

a third fixture plate magnetically attached to one or both of the first and second fixture plates.

12. The modular fixture plate system of claim 1, wherein the top surface further comprises a plurality of recessed areas for receiving decals displaying indicia.

13. A fixture plate for a modular fixture plate system, comprising a top surface comprising a geometric shape;

a plurality of side edges, each of the side edges extending perpendicular to the top surface; and one or more recessed corners having a corner contour between adjacent side edges of the plurality of side edges, said one or more recessed corners receiving a keystone comprising a shape with 90-degree rotational symmetry and a keystone contour corresponding to the corner contour;

wherein each of the side edges and the one or more recessed corners comprises at least one magnet embedded therein and the keystone comprises a ferromagnetic material which is magnetically attached to the one or more recessed corner of the fixture plate.

14. The fixture plate of claim 13, wherein the geometric shape is a square or a rectangle.

15. The fixture plate of claim 13, wherein the geometric shape is an irregular shape and at least one side edge of the plurality of side edges is curved.

16. A method of performing a process on a part using a modular fixture plate system comprising: a first fixture plate having a top surface and a plurality of side edges, each of the side edges extending perpendicular to the top surface and at least two adjoining side edges of the plurality of side edges perpendicular to each other and at least one recessed corner between the two adjoining side edges having a corner contour; and a keystone comprising a shape with 90-degree rotational symmetry and a keystone contour corresponding to the corner contour, wherein the first fixture plate is matable to a second fixture plate using the keystone, wherein each of the side edges and the one or more recessed corners comprises at least one magnet embedded therein and the keystone comprises a ferromagnetic material which is magnetically attached to the one or more recessed corner of the fixture plate, the method comprising:

installing the first fixture plate on a worksurface;

installing a part to be processed on the second fixture plate using fixturing components;

mating the second fixture plate to the first fixture plate using the keystone.

17. The method of claim 16, further comprising:

installing a second part to be processed on a third fixture plate using additional fixturing components; and detaching the second fixture plate from the first fixture plate and replacing the second fixture plate with the third fixture plate.

18. The method of claim 16, further comprising mating a plurality of fixture plates to the first fixture plate.

* * * * *